(12) United States Patent
Abotabl et al.

(10) Patent No.: US 12,550,059 B2
(45) Date of Patent: Feb. 10, 2026

(54) TRANSMIT POWER CONTROL COMMANDS FOR NETWORK POWER SAVING MODES

(71) Applicant: QUALCOMM Incorporated, San Diego, CA (US)

(72) Inventors: Ahmed Attia Abotabl, San Diego, CA (US); Marwen Zorgui, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 520 days.

(21) Appl. No.: 18/056,570

(22) Filed: Nov. 17, 2022

(65) Prior Publication Data

US 2024/0172113 A1 May 23, 2024

(51) Int. Cl.
*H04W 52/02* (2009.01)
*H04W 52/22* (2009.01)

(52) U.S. Cl.
CPC ....... *H04W 52/0225* (2013.01); *H04W 52/22* (2013.01)

(58) Field of Classification Search
CPC .............. H04W 56/005; H04W 56/00; H04W 72/1268; H04W 74/0833; H04W 74/0841; H04W 74/0866; H04W 74/08; H04W 72/12; H04W 60/00; H04W 76/18; H04W 68/005; H04W 8/24; H04W 84/042; H04W 92/24; H04W 68/00; H04W 52/0206; H04W 52/0225; H04W 52/146; H04W 52/22; H04W 52/247; H04W 52/248; H04W 52/287; H04W 52/54; H04W 52/02; G01S 13/003; G01S 13/765; G01S 13/767; G01S 13/87; G01S 13/00; G01S 13/76; G01S 5/02; H04L 43/0864
USPC ......................................................... 370/311
See application file for complete search history.

(56) References Cited

U.S. PATENT DOCUMENTS

| 9,980,281 | B2 * | 5/2018 | Kim ...................... H04W 52/04 |
| 10,880,895 | B2 * | 12/2020 | Gordaychik ........ H04W 72/044 |
| 11,102,734 | B2 * | 8/2021 | Lee ........................ H04L 5/0053 |
| 11,974,237 | B2 * | 4/2024 | Kim .................... H04W 52/146 |
| 2012/0087334 | A1 * | 4/2012 | Suzuki ............. H04W 72/0453 370/329 |
| 2013/0010720 | A1 * | 1/2013 | Lohr ................. H04W 72/0453 370/329 |

(Continued)

FOREIGN PATENT DOCUMENTS

| EP | 3512265 A1 * | 7/2019 | ........... H04B 7/0617 |
| EP | 3850780 B1 * | 2/2025 | .......... H04J 11/0053 |

(Continued)

OTHER PUBLICATIONS

International Search Report and Written Opinion—PCT/US2023/075219—ISA/EPO—Jan. 26, 2024.

*Primary Examiner* — Nathan S Taylor
(74) *Attorney, Agent, or Firm* — Harrity & Harrity, LLP

(57) ABSTRACT

Various aspects of the present disclosure generally relate to wireless communication. In some aspects, a user equipment (UE) may receive downlink control information conveying at least one transmit power control (TPC) command. The UE may transmit a communication using a transmit power based at least in part on the at least one TPC command and a power mode. Numerous other aspects are described.

30 Claims, 18 Drawing Sheets

(56) References Cited

U.S. PATENT DOCUMENTS

| | | | | |
|---|---|---|---|---|
| 2013/0182654 | A1* | 7/2013 | Hariharan | H04W 52/54 370/329 |
| 2013/0190035 | A1* | 7/2013 | Wang | H04W 52/241 455/522 |
| 2014/0023028 | A1* | 1/2014 | Zhang | H04W 52/325 370/329 |
| 2014/0153390 | A1* | 6/2014 | Ishii | H04W 76/15 370/230 |
| 2014/0321406 | A1* | 10/2014 | Marinier | H04B 7/024 370/329 |
| 2015/0358914 | A1* | 12/2015 | Song | H04L 5/14 370/280 |
| 2016/0135147 | A1* | 5/2016 | Ouchi | H04W 52/32 370/329 |
| 2016/0165545 | A1* | 6/2016 | Ouchi | H04W 52/48 455/522 |
| 2016/0165547 | A1* | 6/2016 | Ouchi | H04L 5/14 455/522 |
| 2016/0183198 | A1* | 6/2016 | Xu | H04W 52/241 455/522 |
| 2016/0205632 | A1* | 7/2016 | Yi | H04W 52/367 455/522 |
| 2016/0374026 | A1* | 12/2016 | Dinan | H04W 52/242 |
| 2016/0374027 | A1* | 12/2016 | Dinan | H04W 52/50 |
| 2016/0374072 | A1* | 12/2016 | Dinan | H04W 52/146 |
| 2017/0013611 | A1* | 1/2017 | Dinan | H04W 52/146 |
| 2017/0238260 | A1* | 8/2017 | Kim | H04L 1/1819 455/522 |
| 2018/0092073 | A1* | 3/2018 | Nogami | H04W 52/16 |
| 2018/0124709 | A1* | 5/2018 | Seo | H04W 52/325 |
| 2019/0174466 | A1* | 6/2019 | Zhang | H04L 5/0057 |
| 2019/0281588 | A1* | 9/2019 | Zhang | H04W 52/08 |
| 2020/0029349 | A1* | 1/2020 | Chang | H04W 72/0446 |
| 2020/0154374 | A1* | 5/2020 | Deng | H04W 52/383 |
| 2020/0229104 | A1* | 7/2020 | MolavianJazi | H04W 52/54 |
| 2020/0260391 | A1* | 8/2020 | Zhou | H04W 52/281 |
| 2020/0280925 | A1* | 9/2020 | Iwai | H04B 7/0696 |
| 2020/0305094 | A1* | 9/2020 | Ouchi | H04W 52/325 |
| 2020/0314763 | A1* | 10/2020 | Cheng | H04W 52/146 |
| 2020/0383061 | A1* | 12/2020 | Yang | H04W 52/50 |
| 2020/0396691 | A1* | 12/2020 | Wernersson | H04W 24/10 |
| 2021/0211993 | A1* | 7/2021 | Liu | H04W 52/143 |
| 2021/0258894 | A1* | 8/2021 | Yao | H04W 52/50 |
| 2022/0029764 | A1* | 1/2022 | Liou | H04L 5/0094 |
| 2022/0104239 | A1* | 3/2022 | Papasakellariou | H04W 72/569 |
| 2022/0150839 | A1* | 5/2022 | Islam | H04W 52/08 |
| 2022/0286972 | A1* | 9/2022 | Miao | H04L 5/0053 |
| 2022/0295418 | A1* | 9/2022 | Okamura | H04W 52/242 |
| 2022/0312337 | A1* | 9/2022 | Lim | H04W 52/58 |
| 2023/0076897 | A1* | 3/2023 | Svedman | H04L 5/0094 |
| 2023/0097691 | A1* | 3/2023 | Zhang | H04B 7/0695 455/522 |
| 2023/0180137 | A1* | 6/2023 | Zhang | H04W 52/241 455/522 |
| 2023/0224824 | A1* | 7/2023 | Jung | H04W 52/58 455/522 |
| 2023/0276369 | A1* | 8/2023 | Fu | H04L 5/0051 370/329 |
| 2023/0292261 | A1* | 9/2023 | Yuan | H04W 52/58 |
| 2023/0345470 | A1* | 10/2023 | Yao | H04W 72/232 |
| 2023/0362826 | A1* | 11/2023 | Chen | H04W 52/58 |
| 2024/0080774 | A1* | 3/2024 | Wang | H04L 1/1854 |

FOREIGN PATENT DOCUMENTS

| | | | | |
|---|---|---|---|---|
| WO | WO-2018064073 | A1 * | 4/2018 | H04W 52/16 |
| WO | WO-2022165139 | A1 * | 8/2022 | |
| WO | WO-2022186582 | A1 * | 9/2022 | H04W 52/08 |
| WO | WO-2023043277 | A1 * | 3/2023 | H04W 52/0206 |

* cited by examiner

| TPC Command Field | Accumulated $\delta_{PUSCH,b,f,c}$ or $\delta_{SRS,b,f,c}$ [dB] | Absolute $\delta_{PUSCH,b,f,c}$ or $\delta_{SRS,b,f,c}$ [dB] |
|---|---|---|
| 0 | -1 | -4 |
| 1 | 0 | -1 |
| 2 | 1 | 1 |
| 3 | 3 | 4 |

| TPC command field | Accumulated TPC, mode 1 | Accumulated TPC, mode 2 | Accumulated delta, mode 1 | Accumulated delta, mode 2 |
|---|---|---|---|---|
| 0 | -1 | -2 | -4 | -6 |
| 1 | 0 | 0 | -1 | -2 |
| 2 | 1 | 2 | 1 | 2 |
| 3 | 3 | 4 | 4 | 6 |

FIG. 6E

TRANSMIT POWER CONTROL COMMANDS FOR NETWORK POWER SAVING MODES

FIELD OF THE DISCLOSURE

Aspects of the present disclosure generally relate to wireless communication and to techniques and apparatuses for transmit power control commands for network power saving modes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. 5G, which may be referred to as New Radio (NR), is a set of enhancements to the LTE mobile standard promulgated by the 3GPP. 5G is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in 4G, 5G, and other radio access technologies remain useful.

SUMMARY

A network node may transmit a set of transmit power control (TPC) commands to a user equipment (UE) to control an uplink transmit power of the UE. The TPC commands may include an absolute TPC command or an accumulative TPC command, among other examples. An absolute TPC command may include information indicating a particular transmit power, irrespective of any other TPC commands. For example, a UE may receive an absolute TPC command identifying an entry in a lookup table, and the UE may determine the transmit power based at least in part on the entry in the lookup table. An accumulative TPC command may include information indicating a transmit power relative to a previous transmit power. For example, a UE may receive an accumulative TPC command and determine to increase or decrease a current transmit power based at least in part on a value in the accumulative TPC command.

Some communications systems have introduced power saving modes in which a network node may use different quantities of antennas, different transmit powers, or different loading levels (e.g., different quantities of supported UEs, levels of traffic, or supported signal-to-interference-plus-noise ratio (SINR) values). However, when the network node changes power modes (e.g., between a reduced power mode and a non-reduced power mode or vice versa), a UE may continue to use the same transmit power indicated in a TPC command or interpret the TPC command in the same manner. This may result in the UE transmitting at a transmit power that is not being supported by the network node, which may result in dropped communications or excess interference. Some aspects described herein enable use of TPC commands with different network power modes. For example, a UE may determine a transmit power based at least in part on a TPC command and a network power mode. In this case, as one example, the UE may switch between interpreting a TPC command as an absolute TPC command and interpreting the TPC command as an accumulative TPC command based at least in part on the network power mode. In this way, the network node and the UE can align the UE transmit power with the network power mode, thereby avoiding synchronization issues, dropped communications, and/or excess interference.

Some aspects described herein relate to a method of wireless communication performed by a UE. The method may include receiving downlink control information conveying at least one TPC command. The method may include transmitting a communication using a transmit power based at least in part on the at least one TPC command and a power mode.

Some aspects described herein relate to a method of wireless communication performed by a network node. The method may include transmitting downlink control information conveying at least one TPC command. The method may include receiving a communication using a transmit power based at least in part on the at least one TPC command and a power mode.

Some aspects described herein relate to a UE for wireless communication. The user equipment may include a memory and one or more processors coupled to the memory. The one or more processors may be configured to receive downlink control information conveying at least one TPC command. The one or more processors may be configured to transmit a communication using a transmit power based at least in part on the at least one TPC command and a power mode.

Some aspects described herein relate to a network node for wireless communication. The network node may include a memory and one or more processors coupled to the memory. The one or more processors may be configured to transmit downlink control information conveying at least one TPC command. The one or more processors may be configured to receive a communication using a transmit power based at least in part on the at least one TPC command and a power mode.

Some aspects described herein relate to a non-transitory computer-readable medium that stores a set of instructions for wireless communication by a UE. The set of instructions, when executed by one or more processors of the UE, may cause the UE to receive downlink control information conveying at least one TPC command. The set of instructions, when executed by one or more processors of the UE, may cause the UE to transmit a communication using a transmit power based at least in part on the at least one TPC command and a power mode.

Some aspects described herein relate to a non-transitory computer-readable medium that stores a set of instructions for wireless communication by a network node. The set of instructions, when executed by one or more processors of the network node, may cause the network node to transmit downlink control information conveying at least one TPC command. The set of instructions, when executed by one or more processors of the network node, may cause the network node to receive a communication using a transmit power based at least in part on the at least one TPC command and a power mode.

Some aspects described herein relate to an apparatus for wireless communication. The apparatus may include means for receiving downlink control information conveying at least one TPC command. The apparatus may include means for transmitting a communication using a transmit power based at least in part on the at least one TPC command and a power mode.

Some aspects described herein relate to an apparatus for wireless communication. The apparatus may include means for transmitting downlink control information conveying at least one TPC command. The apparatus may include means for receiving a communication using a transmit power based at least in part on the at least one TPC command and a power mode.

Aspects generally include a method, apparatus, system, computer program product, non-transitory computer-readable medium, user equipment, base station, wireless communication device, network entity, network node, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIGS. 6A-6E are diagrams illustrating an example associated with transmit power control commands for network power saving modes, in accordance with the present disclosure.

DETAILED DESCRIPTION

Figure 1:
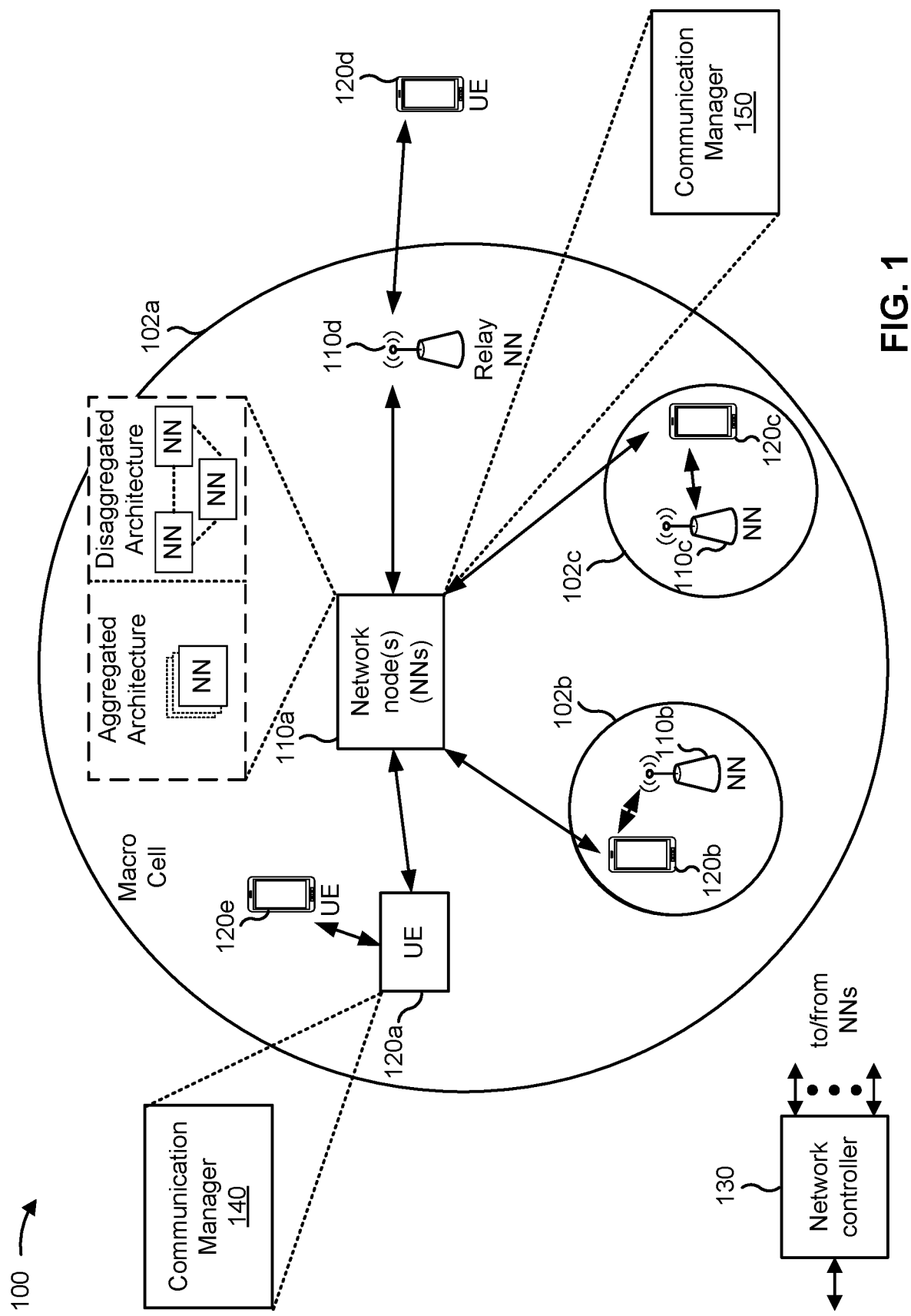
FIG. 1 is a diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device.

In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive downlink control information conveying at least one transmit power control (TPC) command; and transmit a communication using a transmit power based at least in part on the at least one TPC command and a power mode. Additionally, or alternatively, the communication manager 140 may perform one or more other operations described herein.

In some aspects, the network node 110 may include a communication manager 150. As described in more detail elsewhere herein, the communication manager 150 may transmit downlink control information conveying at least one TPC command; and receive a communication using a transmit power based at least in part on the at least one TPC command and a power mode. Additionally, or alternatively, the communication manager 150 may perform one or more other operations described herein.

As indicated above, FIG. 1 is provided as an example. Other examples may differ from what is described with regard to FIG. 1.

Figure 2:
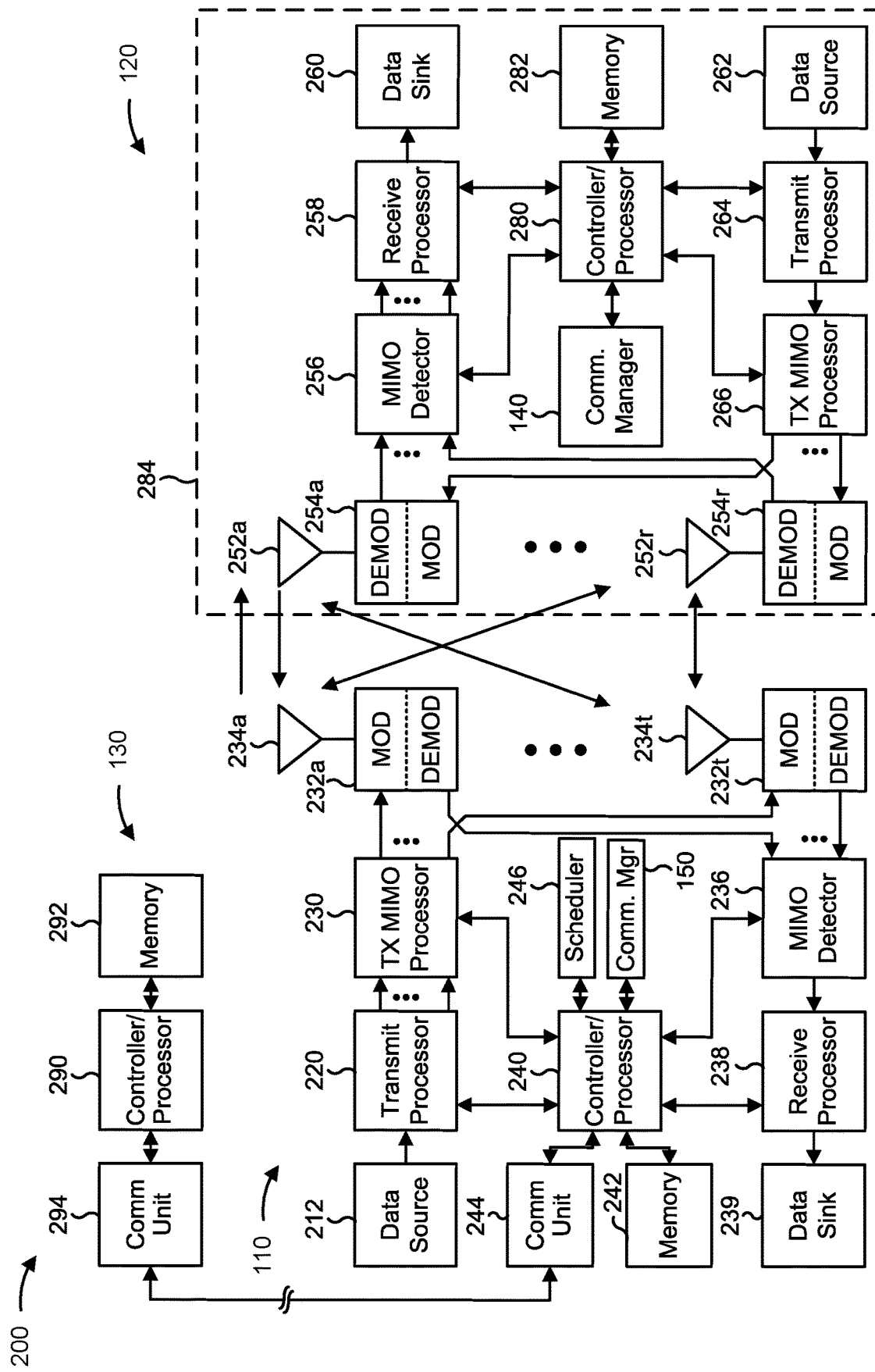
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein.

The controller/processor 240 of the network node 110, the controller/processor 280 of the UE 120, and/or any other component(s) of FIG. 2 may perform one or more techniques associated with TPC commands for network power saving modes, as described in more detail elsewhere herein. For example, the controller/processor 240 of the network node 110, the controller/processor 280 of the UE 120, and/or any other component(s) of FIG. 2 may perform or direct operations of, for example, method 700 of FIG. 7, method 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, method 700 of FIG. 7, method 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving downlink control information conveying at least one TPC command; and/or means for transmitting a communication using a transmit power based at least in part on the at least one TPC command and a power mode. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting downlink control information conveying at least one TPC command; and/or means for receiving a communication using a transmit power based at least in part on the at least one TPC command and a power mode. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
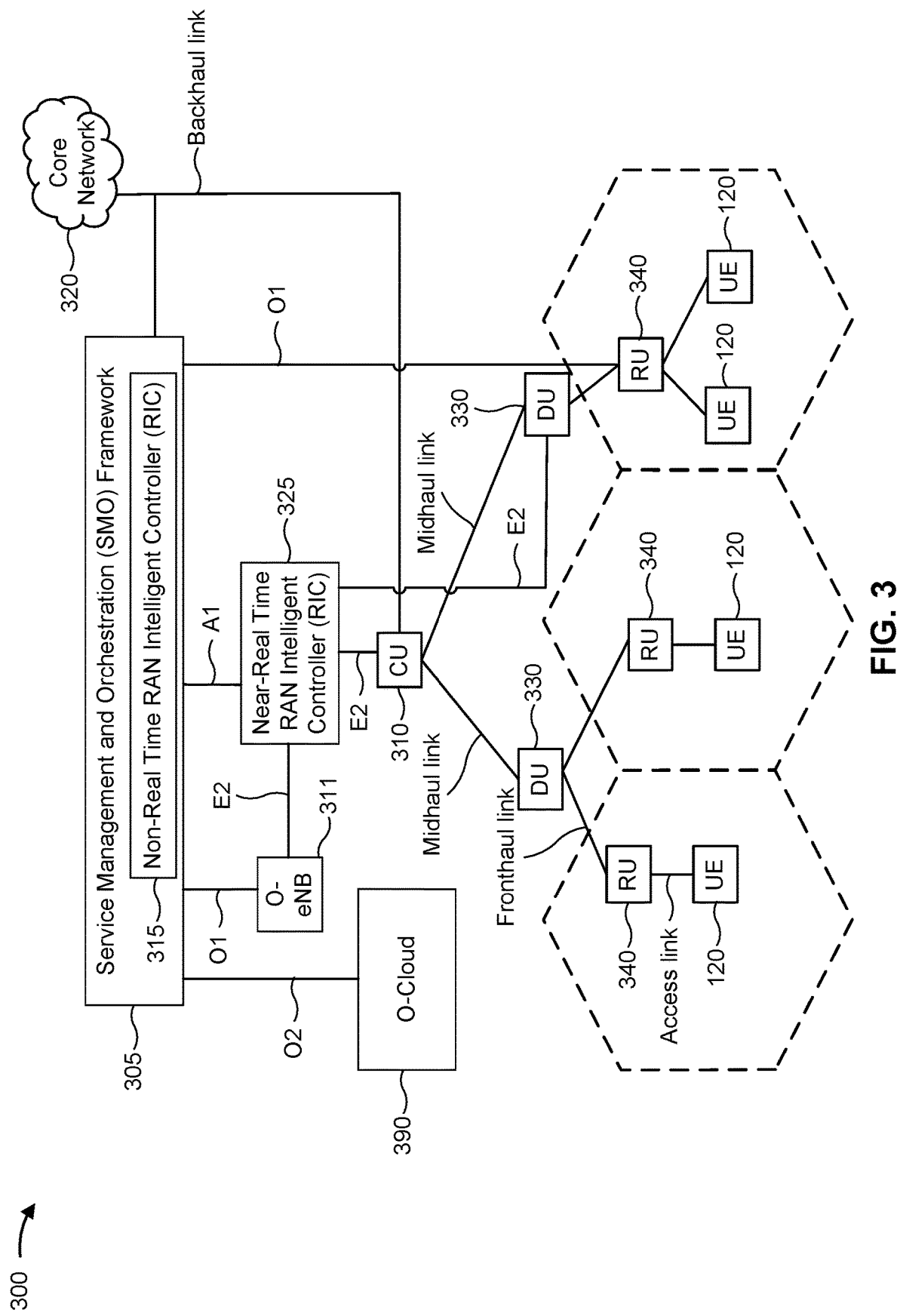
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
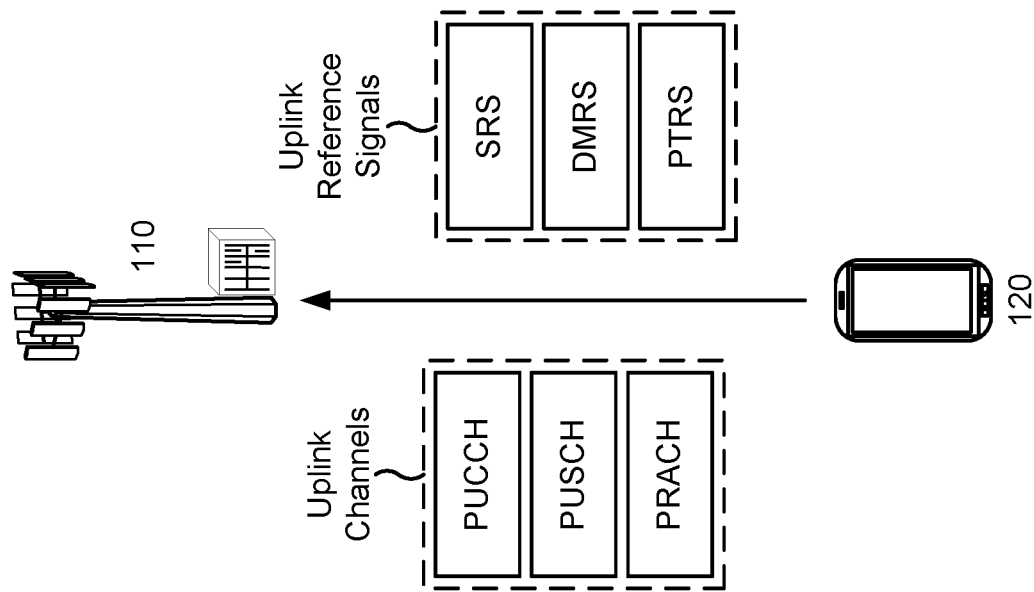
FIG. 4 is a diagram illustrating an example of physical channels and reference signals in a wireless network, in accordance with the present disclosure.
Figure 4:
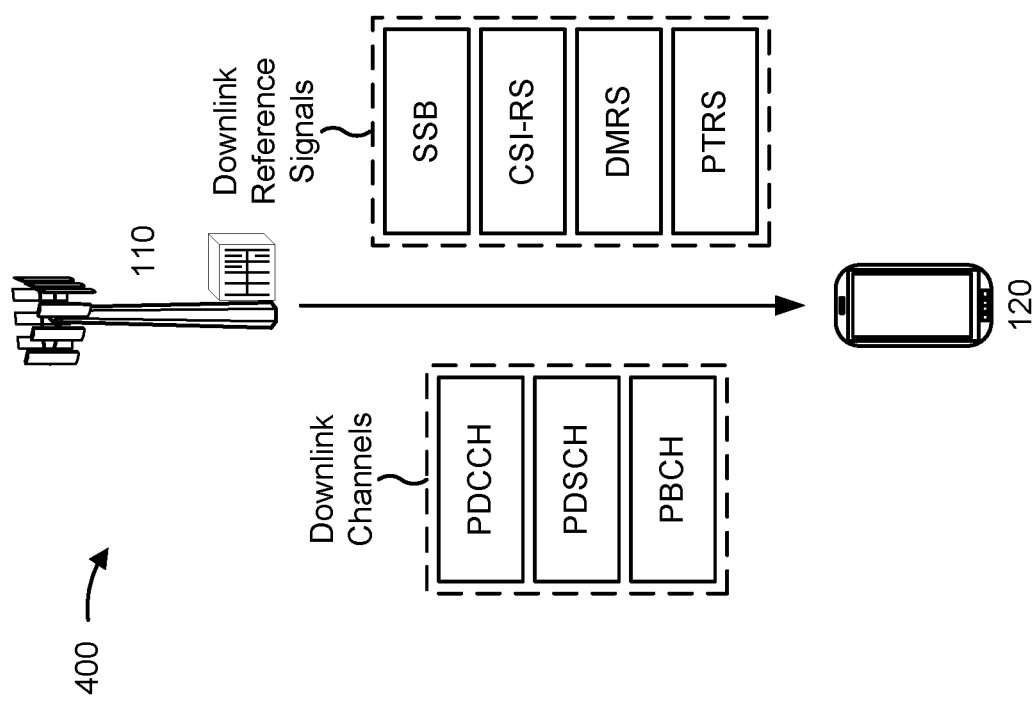

FIG. 4 is a diagram illustrating an example 400 of physical channels and reference signals in a wireless network, in accordance with the present disclosure. As shown in FIG. 4, downlink channels and downlink reference signals may carry information from a network node 110 to a UE 120, and uplink channels and uplink reference signals may carry information from a UE 120 to a network node 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some examples, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some examples, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some examples, the network node 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The network node 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some examples, the network node 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

Figure 5A:
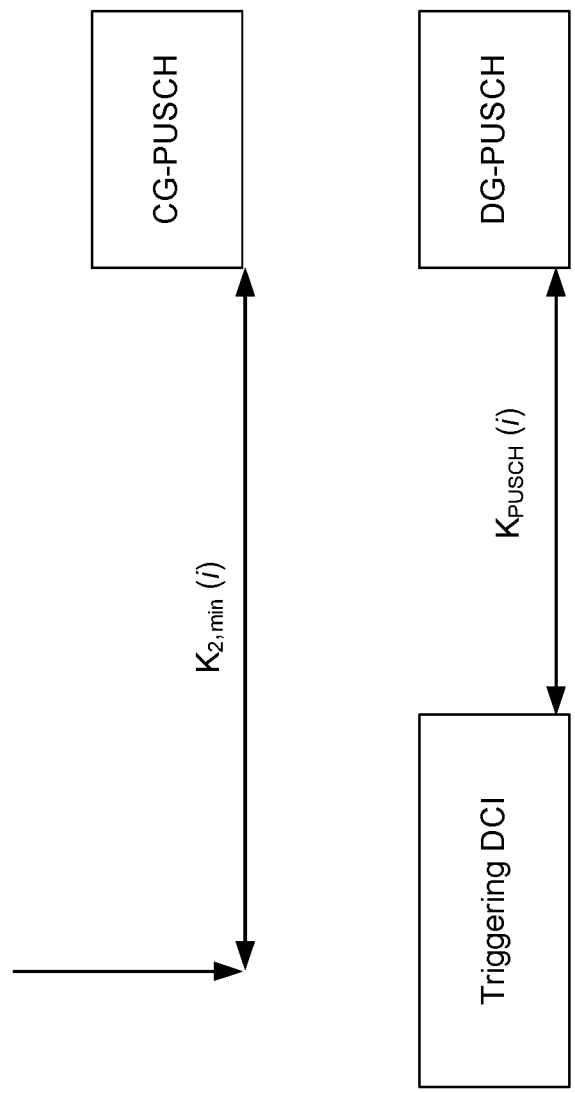
FIGS. 5A-5C are diagrams illustrating an example of transmit power control, in accordance with the present disclosure.
Figure 5B:
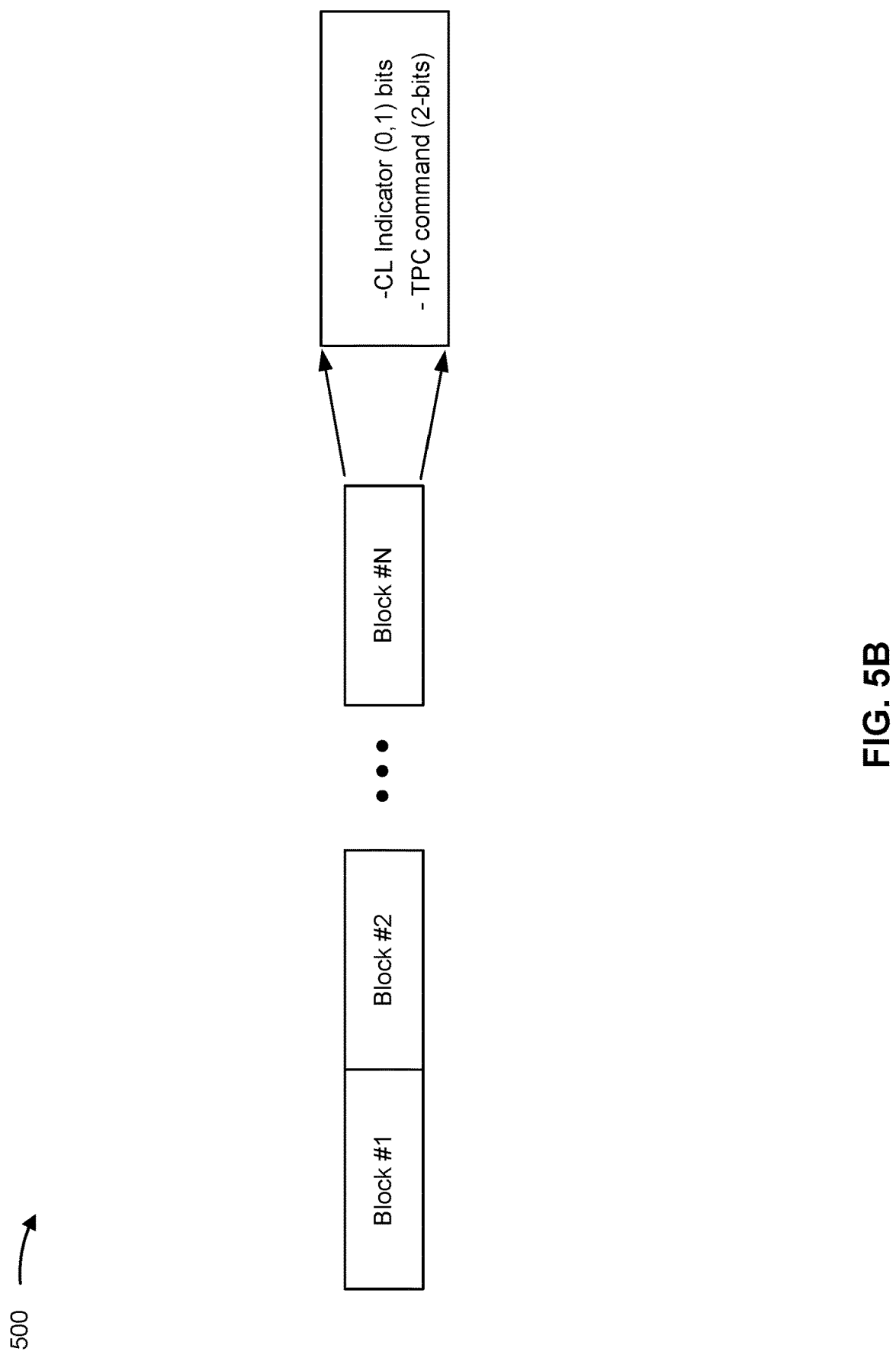
Figure 5C:

FIGS. 5A-5C are diagrams illustrating an example 500 of transmit power control, in accordance with the present disclosure.

As shown in FIG. 5A, a UE (e.g., the UE 120) may use transmission occasions for a configured grant (CG) PUSCH (CG-PUSCH) transmission or a dynamic grant (DG) PUSCH (DG-PUSCH) transmission. In the case of a CG-PUSCH transmission, the UE may receive, from a network node (e.g., the network node 110) on a downlink, a grant of a resource for transmission in a CG-PUSCH occasion i. The UE may transmit, using the granted resource, after a period of time $K_{2,min}(i)$. Similarly, in the case of DG-PUSCH transmission, the UE may receive, from the network node on the downlink, downlink control information (DCI) associated with triggering transmission on a DG-PUSCH occasion i. The UE may transmit, using the DG-PUSCH resource, after a period of time $K_{PUSCH}(i)$. Transmission occasions may also be used for PUCCH, SRS, or PRACH transmission, among other examples. Additional details regarding transmission occasions are described in 3GPP Technical Specification (TS) 38.214 version 17.3.0.

FIG. 5B shows an example of a DCI format (e.g., DCI format 2_2) that can be used for indicating a TPC command for a triggered transmission (e.g., a DG-PUSCH transmission). As shown in FIG. 5B, the DCI format may include a set of blocks and at least one block may include a closed loop (CL) indicator (e.g., a first set of bits, such as 0 bits or 1 bit) and/or a TPC command indicator (e.g., a second set of bits (e.g., 2 bits). Additional details of indicators included in DCI are described in 3GPP TS 38.212 version 17.3.0. The TPC command indicator may convey a TPC command, such as an indicator of a value in a lookup table that a UE can use to determine a transmit power. In one example, the TPC command indicator may identify an absolute TPC value in a first lookup table. For example, the TPC command indicator may identify an entry in the first lookup table that identifies a particular transmit power. In another example, the TPC command indicator may identify an accumulative TPC value in a second lookup table. For example, the TPC command indicator may identify an entry in a second lookup table that corresponds to whether a previous transmit power is to be incremented or decremented by an indicated amount.

FIG. 5C shows an example of a lookup table (or a set of lookup tables) for a TPC command. As shown in FIG. 5C, a TPC command may have a value (e.g., from a 2-bit TPC command indicator) of 0-3, which may correspond to an accumulated TPC value or an absolute TPC value. For example, a TPC command field may map to an accumulated TPC value for a PUSCH transmission $\delta_{PUSCH,b,f,c}$ or an accumulated TPC value for an SRS transmission $\delta_{SRS,b,f,c}$. Similarly, the TPC command field may map to an absolute TPC value for a PUSCH transmission $\delta_{PUSCH,b,f,c}$ or an absolute TPC value for an SRS transmission $\delta_{SRS,b,f,c}$. In some examples, a single lookup table may enable mapping between a TPC command and multiple types of transmissions and/or types of TPC values. Alternatively, multiple lookup tables may enable mapping between a TPC command and multiple types of transmissions and/or types of TPC values. Additional details regarding the mapping of a TPC command field to a TPC value are described in 3GPP TS 38.213.

As indicated above, FIGS. 5A-5C are provided as an example. Other examples may differ from what is described with respect to FIGS. 5A-5C.

A network node may transmit a set of TPC commands to a UE to control an uplink transmit power of the UE. The TPC commands may include an absolute TPC command or an accumulative TPC command, among other examples. An absolute TPC command may include information indicating a particular transmit power, irrespective of any other TPC commands. For example, a UE may receive an absolute TPC command identifying an entry in a lookup table, and the UE may determine the transmit power based at least in part on the entry in the lookup table. An accumulative TPC command may include information indicating a transmit power relative to a previous transmit power. For example, a UE may receive an accumulative TPC command and determine to increase or decrease a current transmit power based at least in part on a value in the accumulative TPC command.

Some communications systems have introduced power saving modes in which a network node may use different quantities of antennas, different transmit powers, or different loading levels (e.g., different quantities of supported UEs, levels of traffic, or supported signal-to-interference-plus-noise ratio (SINR) values). However, when the network node changes power modes (e.g., between a reduced power mode and a non-reduced power mode or vice versa), a UE may continue to use the same transmit power indicated in a TPC command or interpret the TPC command in the same manner. This may result in the UE transmitting at a transmit power that is not being supported by the network node, which may result in dropped communications or excess interference. Some aspects described herein enable use of TPC commands with different network power modes. For example, a UE may determine a transmit power based at least in part on a TPC command and a network power mode. In this case, as one example, the UE may switch between interpreting a TPC command as an absolute TPC command and interpreting the TPC command as an accumulative TPC command based at least in part on the network power mode. In this way, the network node and the UE can align the UE transmit power with the network power mode, thereby avoiding synchronization issues, dropped communications, and/or excess interference.

Figure 6A:
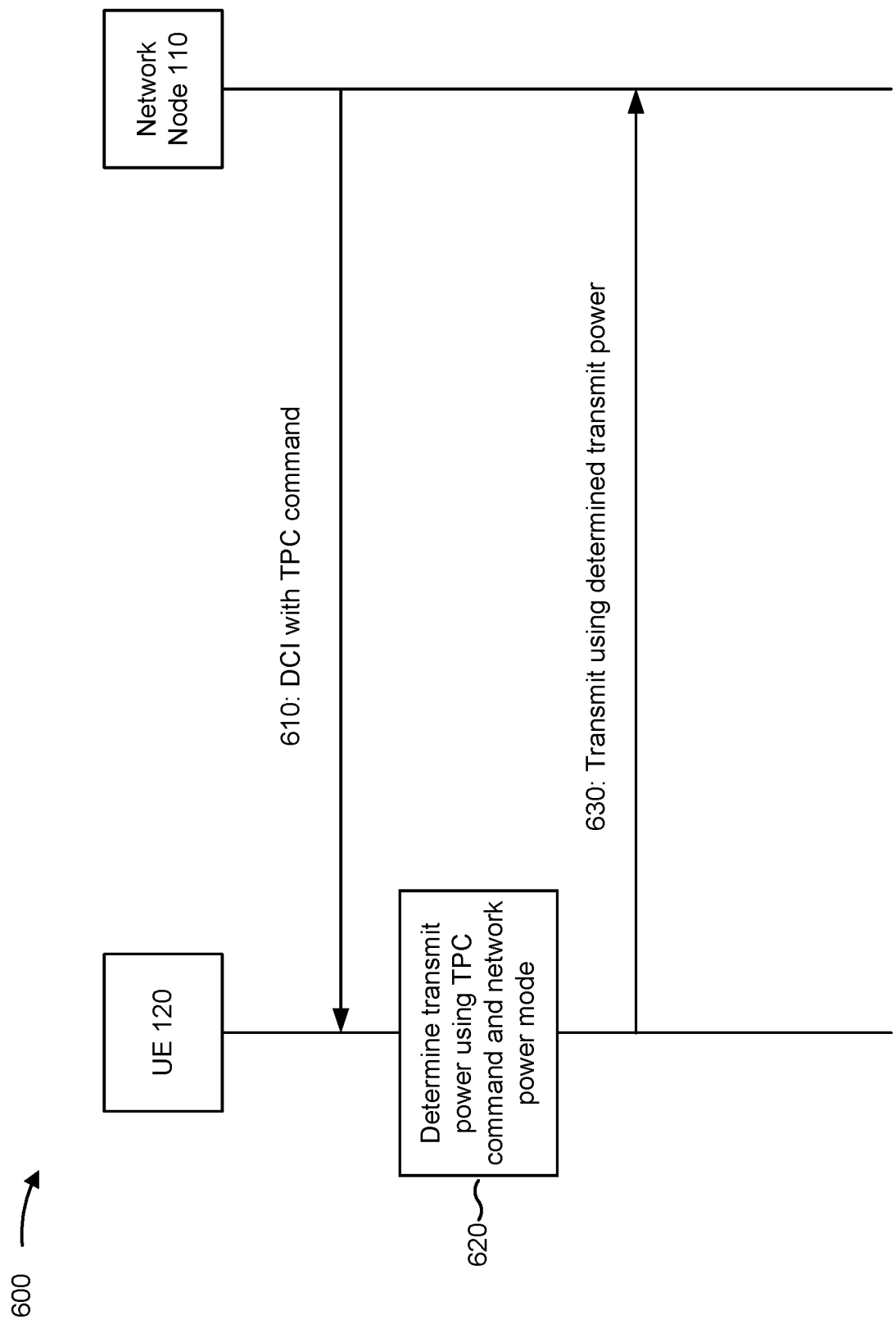

FIGS. 6A-6E are diagrams illustrating an example 600 associated with transmit power control commands for network power saving modes, in accordance with the present disclosure. As shown in FIG. 6A, example 600 includes communication between a network node 110 and a UE 120.

As further shown in FIG. 6A, and at 610, the UE 120 may receive DCI with a TPC command. For example, the UE 120 may receive DCI including a single TPC command or a plurality of TPC commands. Additionally, or alternatively, the UE 120 may receive a plurality of DCI messages conveying a plurality of TPC commands.

As further shown in FIG. 6A, and at 620, the UE 120 may determine a transmit power using a TPC command and a network power mode. For example, the UE 120 may interpret a TPC command in a particular manner based at least in part on the network power mode (e.g., as an accumulative TPC command or an absolute TPC command) and/or may include or exclude a TPC command from a transmit power determination based at least in part on the network power mode (e.g., of a set of TPC commands, one or more TPC commands may be included or excluded based at least in part on a current network power mode or a previous network power mode, such as a network power mode at a time when the one or more TPC commands were received).

Figure 6B:
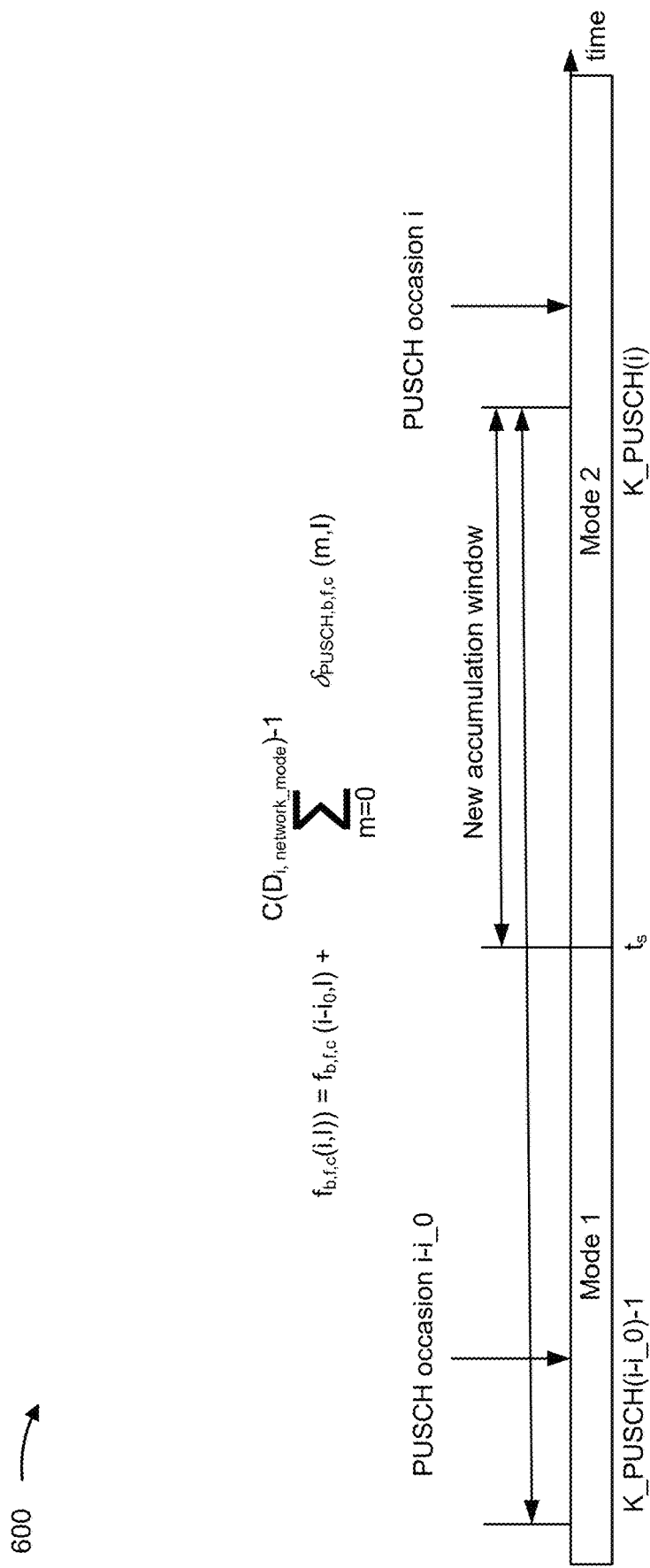

In some aspects, the UE 120 may include one or more TPC commands, in a transmit power determination, that are received in a current network power mode. For example, as shown in FIG. 6B, a first PUSCH occasion i-i_0 may occur during a first network power mode (Mode 1) and a second PUSCH occasion i may occur during a second network power mode (Mode 2). When the network power mode is not used to select which TPC commands to apply when determining a transmit power, an accumulation window for the second PUSCH occasion i may occur from a period $K_{PUSCH\,(i-i\_0)-1}$ to $K_{PUSCH(i)}$. In other words, the accumulation window spans from a first threshold period of time before the first PUSCH occasion (e.g., a period of time when any received TPC commands are too close to the first PUSCH occasion to be applied) to a second threshold period of time before the second PUSCH occasion (e.g., a period of time when any received TPC commands are too close to the second PUSCH occasion to be applied). However, here, the UE 120 determines to only use TPC commands received during the current active network mode. Accordingly, a new accumulation window extends from a period of time $t_s$ (e.g., when the network power mode switches) to the second threshold period of time before the second PUSCH occasion. The UE 120 identifies a set of TPC commands D received during the new accumulation window and determines the transmit power according to an equation:

$$f_{b,f,c}(i, l)) = f_{b,f,c}(i - i_0, l) + \sum_{m=0}^{C(D_{i,network\_mode})-1} \delta_{PUSCH\,b,f,c}(m, l)$$

where f represents a transmit power of a PUSCH occasion i, δ is a value to apply for each TPC command (e.g., an accumulative change in transmit power), and D is a set of TPC commands received during the new accumulation window.

Figure 6C:
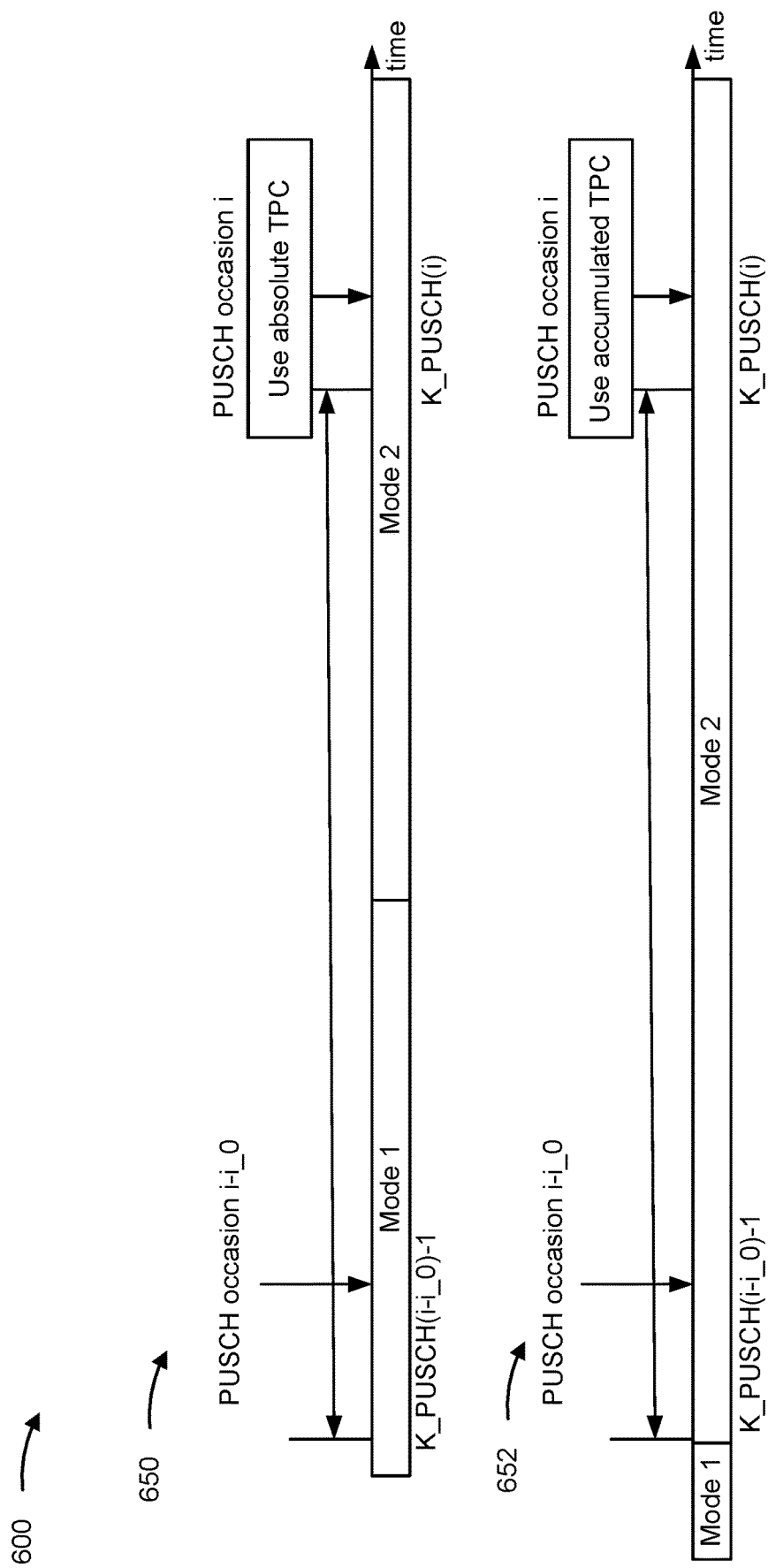

In some aspects, the UE 120 may determine a type of TPC command to apply to determine a transmit power based at least in part on in which network mode a TPC command is received. For example, as shown in FIG. 6C, and by diagram 650, a PUSCH occasion i may occur during the second power mode and a TPC command may be received during the first power mode and during an accumulation window for the PUSCH occasion i. In this case, the UE 120 may determine to interpret the received TPC command as an absolute TPC command even when the UE 120 is currently configured for accumulative TPC commands. In other words, the UE 120 may interpret the received TPC command as an absolute TPC command based at least in part on the TPC command being received in a different power mode than the PUSCH occasion i, rather than interpreting the received TPC command as an accumulative TPC command based at least in part on a static or semi-static configuration of the UE 120. In contrast, as shown by diagram 652, when the TPC command is received in the same power mode as the PUSCH occasion i, the UE 120 may interpret the TPC command as an accumulative TPC command in accordance with the static or semi-static configuration of the UE 120. In another example, the UE 120 may interpret the TPC command as accumulative when received in a different network power mode and may interpret the TPC command using a static or semi-static configuration when received in the same network power mode.

Figure 6D:
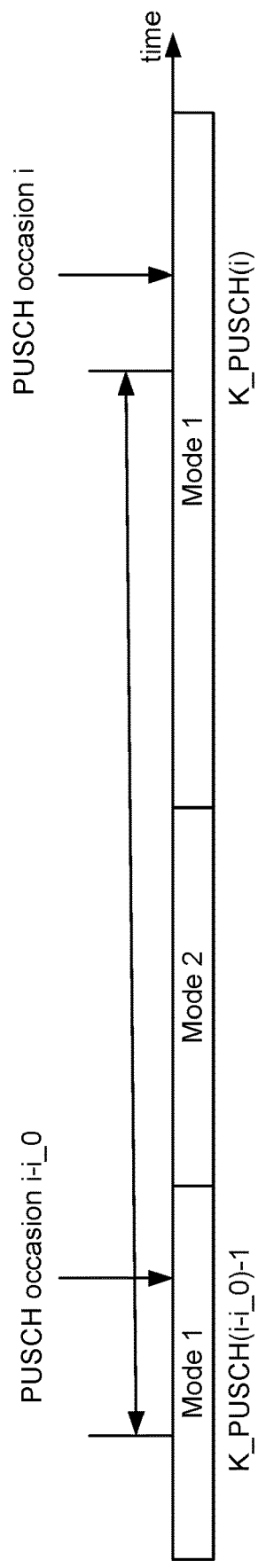

In some aspects, the UE 120 may determine an accumulation window based at least in part on whether TPC commands are received in a contiguous period of a network power mode. For example, as shown in FIG. 6D, the first PUSCH occasion and the second PUSCH occasion may each occur in the same network power mode (Mode 1) with a different network power mode (Mode 0) occurring between the PUSCH occasions. In other words, Mode 1 is not contiguous with respect to the pair of PUSCH occasions. In some aspects, the UE 120 may use TPC command received in the network power mode of the second PUSCH occasion even when the network power mode is non-contiguous. In other words, the UE 120 may use TPC commands received in Mode 1, before the transition to Mode 2 and the transition back to Mode 1. Alternatively, the UE 120 may use TPC commands, for determining a transmit power for the second PUSCH occasion, received in a contiguous portion of the network power mode of the second PUSCH occasion. In this case, the UE 120 may include TPC commands received after the transition from Mode 2 to Mode 1, but exclude TPC commands received in Mode 1 before the transition to Mode (and transition back to Mode 1).

In some aspects, the UE 120 may determine a TPC value or lookup table (or portion thereof) to use for determining a transmit power based at least in part on a network power saving mode. For example, as shown in FIG. 6E, the UE 120 may include a lookup table mapping TPC command fields to accumulated TPC values and absolute TPC values for power mode 1 and power mode 2. In this case, when the UE 120 is determining a transmit power for a PUSCH occasion in power mode 1 and is configured for accumulated TPC commands (e.g., as a static or semi-static configuration or based at least in part on the network power saving mode), the UE 120 may map the TPC command field to the first column of the lookup table. In contrast, when the UE 120 is determining the transmit power for a PUSCH occasion in power mode 2 and is configured for accumulated TPC commands, the UE 120 may map the TPC command field to the second column of the lookup table, which may have different values than the first column of the lookup table. In other words, a TPC command with a value of 2 may correspond to a 1 decibel (dB) change in transmit power when power mode 1 is enabled and a 2 dB change in transmit power when power mode 2 is enabled.

As further shown in FIG. 6A, and at 630, the UE 120 may transmit using the determined transmit power mode. For example, the UE 120 may transmit a PUSCH transmission using the determined transmit power. Additionally, or alternatively, the UE 120 may transmit a PUCCH transmission, a PRACH transmission, or an SRS transmission using the determined transmit power.

As indicated above, FIGS. 6A-6E are provided as an example. Other examples may differ from what is described with respect to FIGS. 6A-6E.

Figure 7:
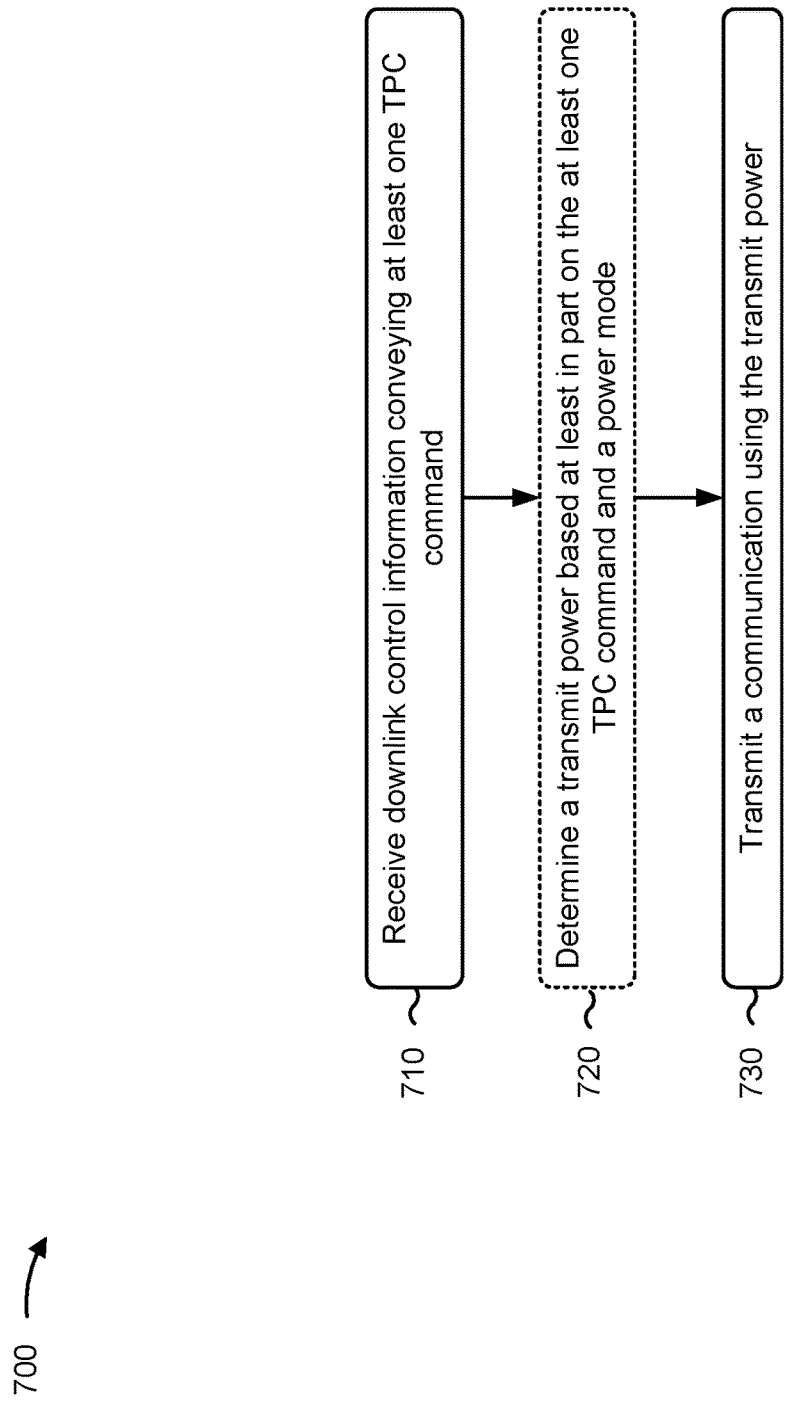
FIGS. 7 and 8 are flowcharts of example methods of wireless communication.

FIG. 7 is a flowchart of an example method 700 of wireless communication. The method 700 may be performed by, for example, a UE (e.g., UE 120).

At 710, the UE may receive downlink control information conveying at least one TPC command. For example, the UE (e.g., using communication manager 140 and/or reception component 902, depicted in FIG. 9) may receive downlink control information conveying at least one TPC command, as described above in connection with, for example, FIG. 6A and at 610. In some aspects, receiving the at least one TPC command comprises receiving, during a first network power mode, a particular TPC command after a first transmission occasion associated with the first network power mode, and determining, based at least in part on an absolute value of the particular TPC command and when a TPC accumulation mode is active, the transmit power for transmitting the communication in a second transmission occasion associated with a second network power mode.

In some aspects, receiving the at least one TPC command comprises receiving, during a first network power mode, a particular TPC command after a first transmission occasion associated with the first network power mode, and determining, based at least in part on an absolute value of the particular TPC command and when a TPC accumulation mode is active, the transmit power for transmitting the communication in a second transmission occasion associated with a second network power mode. In some aspects, the at least one TPC command is received after a first transmission occasion and before a second transmission occasion, the first transmission occasion and the second transmission occasion being associated with a first network power mode, a second network power mode occurring between the first transmission occasion and the second transmission occasion. In some aspects, receiving the at least one TPC command comprises receiving, during a particular network mode, a particular TPC command, and determining the transmit power for a physical uplink shared channel transmission occasion for transmitting the communication during the particular network mode using an accumulative TPC value or an absolute TPC value, wherein the transmit power is determined using the accumulative TPC value or the absolute TPC value based at least in part on a type of active TPC mode.

At 720, in some aspects, the UE may determine a transmit power based at least in part on the at least one TPC command and a power mode. For example, the UE (e.g., using communication manager 140 and/or determination component 908, depicted in FIG. 9) may determine the transmit power based at least in part on the at least one TPC command and a power mode, as described above in connection with, for example, FIG. 6A and at 620. In some aspects, method 700 includes determining the transmit power based at least in part on one or more TPC commands, of the at least one TPC command, received after an end of the second network power mode and excluding any TPC commands received before the end of the second network power mode.

In some aspects, method 700 includes determining the transmit power based at least in part on one or more TPC commands, of the at least one TPC command, received during the first network power mode and excluding any TPC commands received during the second network power mode. In some aspects, a mapping of the at least one TPC command to a set of TPC accumulation values, of a plurality of possible sets of TPC accumulation values, is based at least in part on the power mode. In some aspects, a mapping of the at least one TPC command to a set of TPC absolute values, of a plurality of possible sets of TPC absolute values, is based at least in part on the power mode.

At 730, the UE may transmit a communication using the transmit power. For example, the UE (e.g., using communication manager 140 and/or transmission component 904, depicted in FIG. 9) may transmit a communication using a transmit power based at least in part on the at least one TPC command and a power mode, as described above in connection with, for example, FIG. 6A and at 630. In some aspects, a physical uplink shared channel for conveying the communication occurs during a period associated with a network power saving mode, and method 700 includes determining the transmit power based at least in part on an accumulation of one or more TPC commands, of the at least one TPC command, that are received in connection with the period associated with the network power saving mode.

Although FIG. 7 shows example blocks of method 700, in some aspects, method 700 may include additional blocks, fewer blocks, different blocks, or differently arranged blocks than those depicted in FIG. 7. Additionally, or alternatively, two or more of the blocks of method 700 may be performed in parallel.

Figure 8:
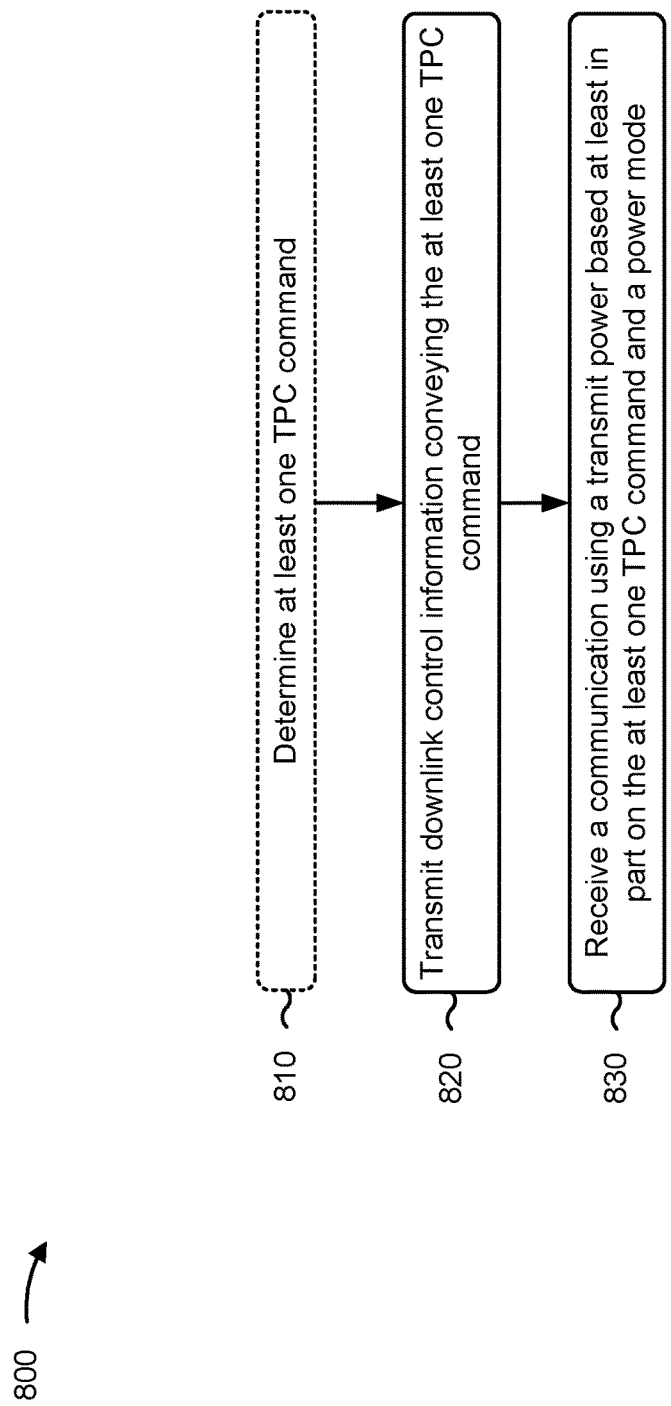

FIG. 8 is a flowchart of an example method 800 of wireless communication. The method 800 may be performed by, for example, a network node (e.g., network node 110).

At 810, in some aspects, the network node may determine at least one TPC command. For example, the network node (e.g., using communication manager 150 and/or determination component 1108, depicted in FIG. 11) may determine at least one TPC command, as described above in connection with, for example, FIG. 6A and at 610. In some aspects, a mapping of the at least one TPC command to a set of TPC accumulation values, of a plurality of possible sets of TPC accumulation values, is based at least in part on the power mode. In some aspects, a mapping of the at least one TPC command to a set of TPC absolute values, of a plurality of possible sets of TPC absolute values, is based at least in part on the power mode.

At 820, the network node may transmit downlink control information conveying at least one TPC command. For example, the network node (e.g., using communication manager 150 and/or transmission component 1104, depicted in FIG. 11) may transmit downlink control information conveying at least one TPC command, as described above in connection with, for example, FIG. 6A and at 610. In some aspects, a physical uplink shared channel for conveying the communication occurs during a period associated with a network power saving mode, and the transmit power is based at least in part on an accumulation of one or more TPC commands, of the at least one TPC command, that are transmitted in connection with the period associated with the network power saving mode. In some aspects, transmitting the at least one TPC command comprises transmitting, during a first network power mode, a particular TPC command after a first transmission occasion associated with the first network power mode, wherein the transmit power, for transmitting the communication in a second transmission occasion associated with a second network power mode, is determined based at least in part on an absolute value of the particular TPC command and when a TPC accumulation mode is active.

In some aspects, transmitting the at least one TPC command comprises transmitting, during a particular network mode, a particular TPC command, wherein the transmit power, for a physical uplink shared channel transmission occasion for transmitting the communication during the particular network mode, is determined using an accumulative TPC value or using an absolute TPC value and is based at least in part on a type of active TPC mode. In some aspects, the at least one TPC command is received after a first transmission occasion and before a second transmission occasion, the first transmission occasion and the second transmission occasion being associated with a first network power mode, a second network power mode occurring between the first transmission occasion and the second transmission occasion.

At 830, the network node may receive a communication using a transmit power based at least in part on the at least one TPC command and a power mode. For example, the network node (e.g., using communication manager 150 and/or reception component 1102, depicted in FIG. 11) may receive a communication using a transmit power based at least in part on the at least one TPC command and a power mode, as described above in connection with, for example, FIG. 6A and at 610. In some aspects, the transmit power is based at least in part on one or more TPC commands, of the at least one TPC command, transmitted during the first network power mode and excluding any TPC commands transmitted during the second network power mode. In some aspects, the transmit power is based at least in part on one or more TPC commands, of the at least one TPC command, transmitted after an end of the second network power mode and excluding any TPC commands transmitted before the end of the second network power mode.

Although FIG. 8 shows example blocks of method 800, in some aspects, method 800 may include additional blocks, fewer blocks, different blocks, or differently arranged blocks than those depicted in FIG. 8. Additionally, or alternatively, two or more of the blocks of method 800 may be performed in parallel.

Figure 9:
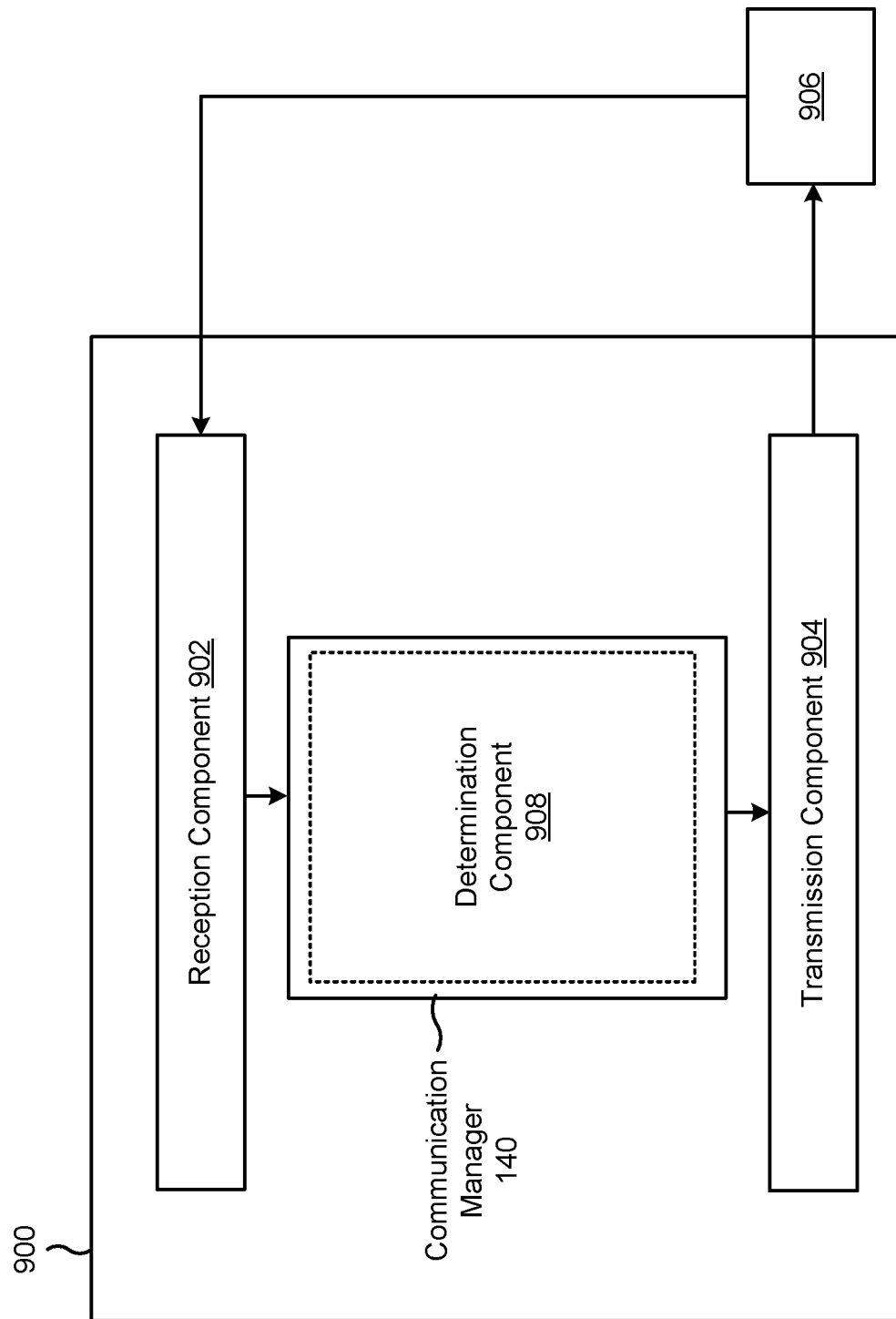
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a determination component 908, among other examples.

In some aspects, the apparatus 900 may be configured to perform one or more operations described herein in connection with FIGS. 6A-6E. Additionally, or alternatively, the apparatus 900 may be configured to perform one or more processes described herein, such as method 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive downlink control information conveying at least one TPC command. The transmission component 904 may transmit a communication using a transmit power based at least in part on the at least one TPC command and a power mode.

The determination component 908 may determine the transmit power based at least in part on one or more TPC commands, of the at least one TPC command, received during the first network power mode and excluding any TPC commands received during the second network power mode. The determination component 908 may determine the transmit power based at least in part on one or more TPC commands, of the at least one TPC command, received after an end of the second network power mode and excluding any TPC commands received before the end of the second network power mode.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
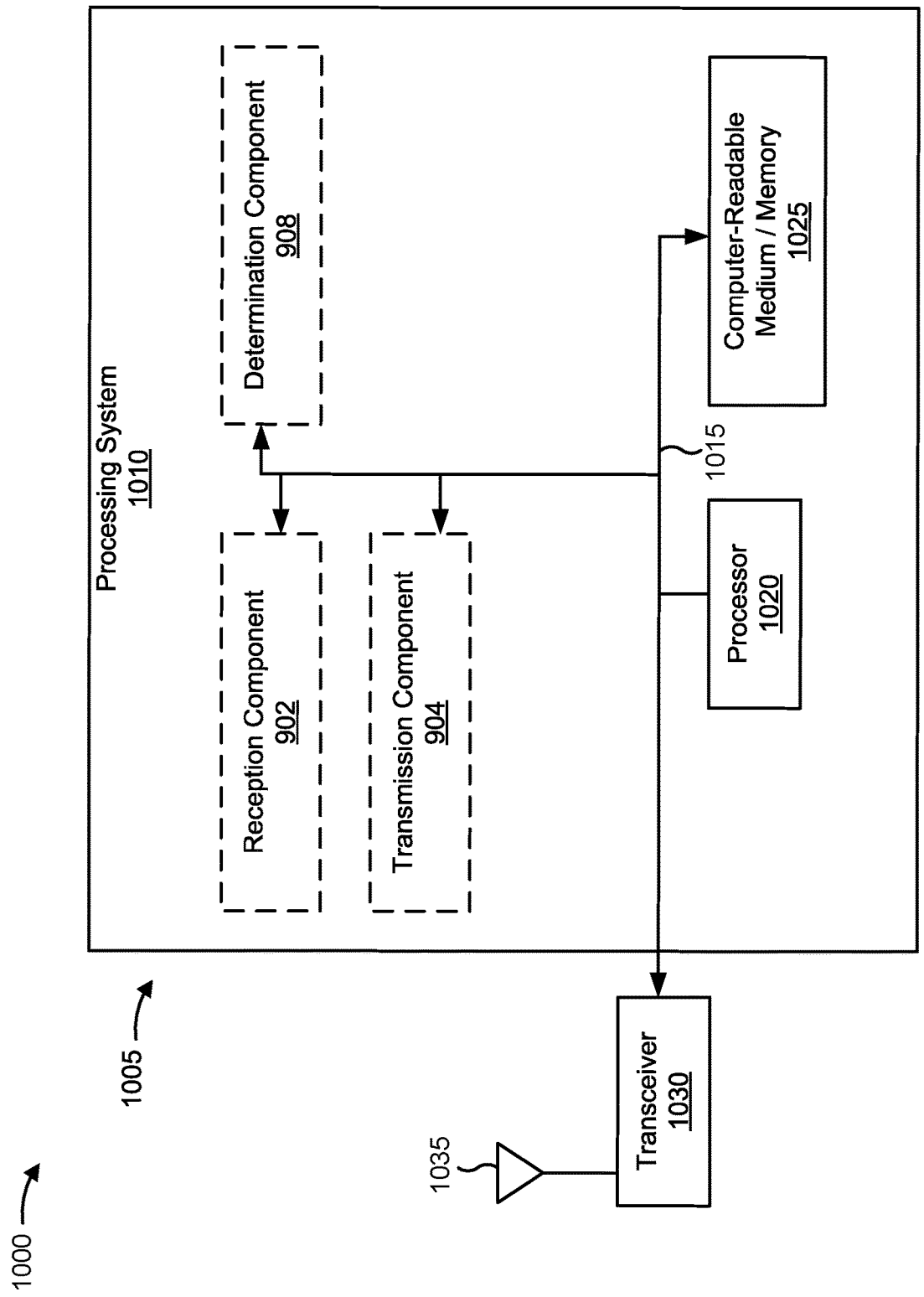
FIG. 10 is a diagram illustrating an example of a hardware implementation for an apparatus employing a processing system, in accordance with the present disclosure.

FIG. 10 is a diagram illustrating an example 1000 of a hardware implementation for an apparatus 1005 employing a processing system 1010, in accordance with the present disclosure. The apparatus 1005 may be a UE.

The processing system 1010 may be implemented with a bus architecture, represented generally by the bus 1015. The bus 1015 may include any number of interconnecting buses and bridges depending on the specific application of the processing system 1010 and the overall design constraints. The bus 1015 links together various circuits including one or more processors and/or hardware components, represented by the processor 1020, the illustrated components, and the computer-readable medium/memory 1025. The bus 1015 may also link various other circuits, such as timing sources, peripherals, voltage regulators, and/or power management circuits.

The processing system 1010 may be coupled to a transceiver 1030. The transceiver 1030 is coupled to one or more antennas 1035. The transceiver 1030 provides a means for communicating with various other apparatuses over a transmission medium. The transceiver 1030 receives a signal from the one or more antennas 1035, extracts information from the received signal, and provides the extracted information to the processing system 1010, specifically the reception component 902. In addition, the transceiver 1030 receives information from the processing system 1010, specifically the transmission component 904, and generates a signal to be applied to the one or more antennas 1035 based at least in part on the received information.

The processing system 1010 includes a processor 1020 coupled to a computer-readable medium/memory 1025. The processor 1020 is responsible for general processing, including the execution of software stored on the computer-readable medium/memory 1025. The software, when executed by the processor 1020, causes the processing system 1010 to perform the various functions described herein for any particular apparatus. The computer-readable medium/memory 1025 may also be used for storing data that is manipulated by the processor 1020 when executing software. The processing system further includes at least one of the illustrated components. The components may be software modules running in the processor 1020, resident/stored in the computer readable medium/memory 1025, one or more hardware modules coupled to the processor 1020, or some combination thereof.

In some aspects, the processing system 1010 may be a component of the UE 120 and may include the memory 282 and/or at least one of the TX MIMO processor 266, the RX processor 258, and/or the controller/processor 280. In some aspects, the apparatus 1005 for wireless communication includes means for receiving downlink control information conveying at least one TPC command and means for transmitting a communication using a transmit power based at least in part on the at least one TPC command and a power mode. The aforementioned means may be one or more of the aforementioned components of the apparatus 900 and/or the processing system 1010 of the apparatus 1005 configured to perform the functions recited by the aforementioned means. As described elsewhere herein, the processing system 1010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

Figure 11:
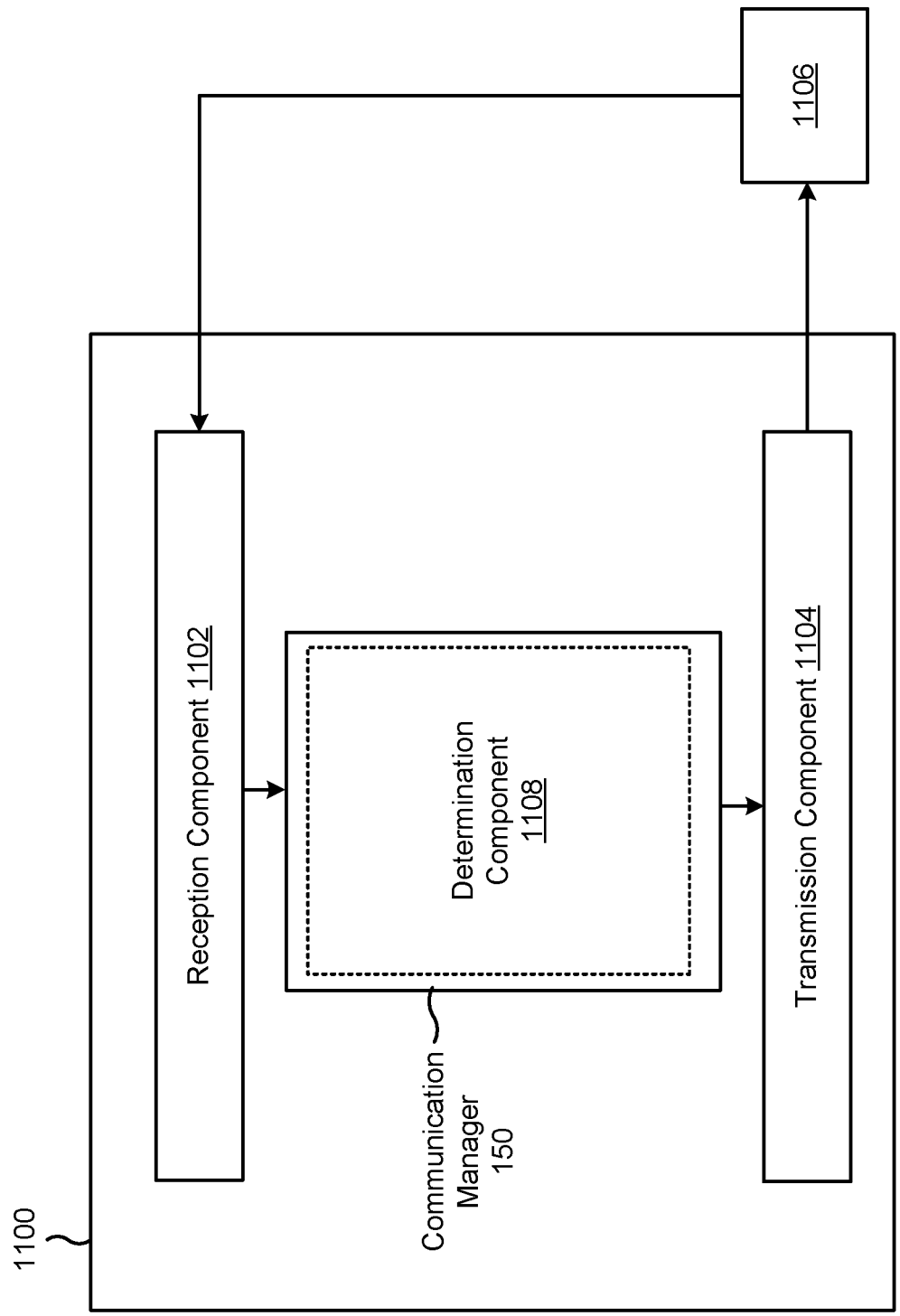
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a determination component 1108, among other examples.

In some aspects, the apparatus 1100 may be configured to perform one or more operations described herein in connection with FIGS. 6A-6E. Additionally, or alternatively, the apparatus 1100 may be configured to perform one or more processes described herein, such as method 800 of FIG. 8. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The transmission component 1104 may transmit downlink control information conveying at least one TPC command. The reception component 1102 may receive a communication using a transmit power based at least in part on the at least one TPC command and a power mode. The determination component 1108 may determine the TPC command.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
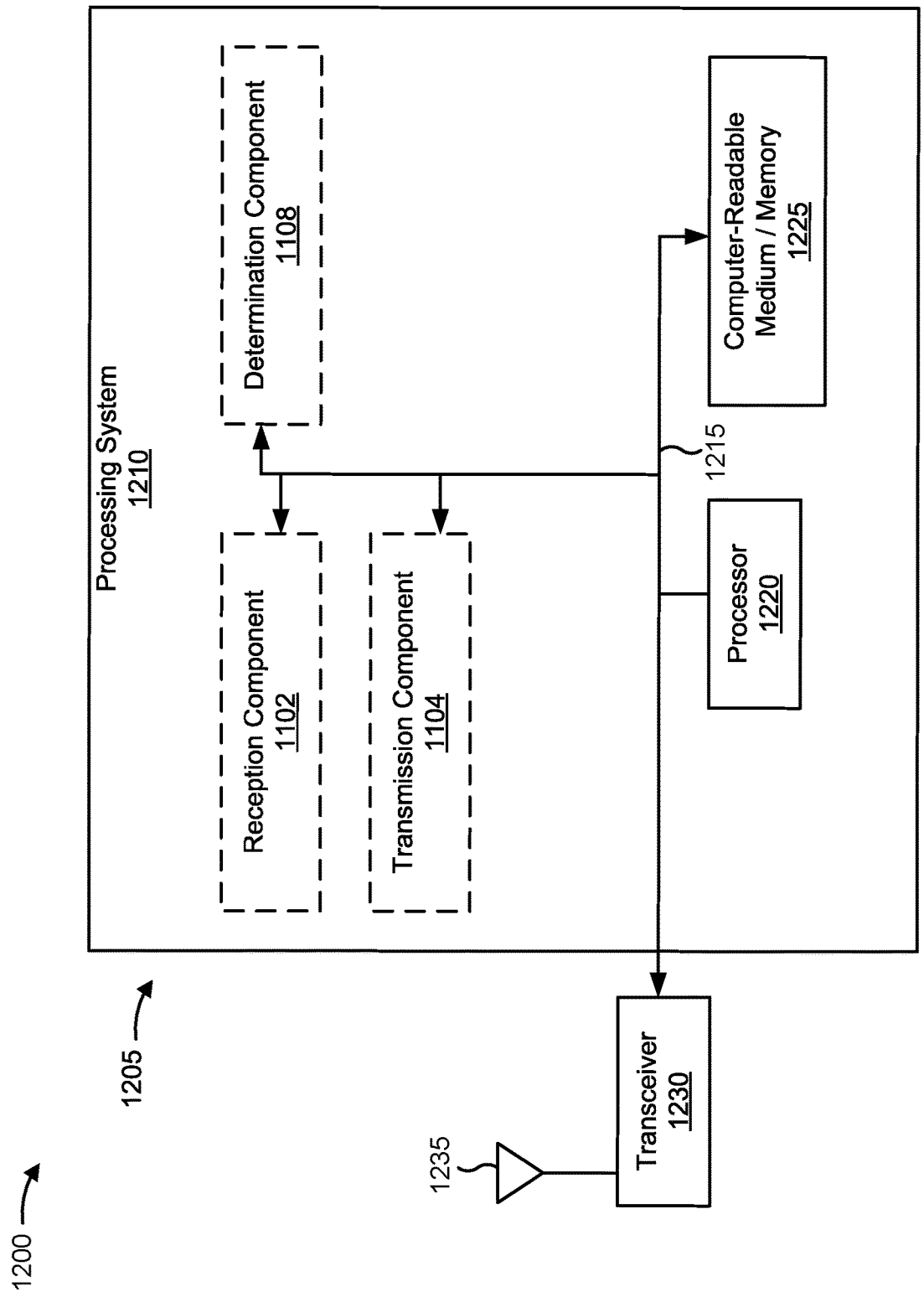
FIG. 12 is a diagram illustrating an example of a hardware implementation for an apparatus employing a processing system, in accordance with the present disclosure.

FIG. 12 is a diagram illustrating an example 1200 of a hardware implementation for an apparatus 1205 employing a processing system 1210, in accordance with the present disclosure. The apparatus 1205 may be a network node.

The processing system 1210 may be implemented with a bus architecture, represented generally by the bus 1215. The bus 1215 may include any number of interconnecting buses and bridges depending on the specific application of the processing system 1210 and the overall design constraints. The bus 1215 links together various circuits including one or more processors and/or hardware components, represented by the processor 1220, the illustrated components, and the computer-readable medium/memory 1225. The bus 1215 may also link various other circuits, such as timing sources, peripherals, voltage regulators, and/or power management circuits.

The processing system 1210 may be coupled to a transceiver 1230. The transceiver 1230 is coupled to one or more antennas 1235. The transceiver 1230 provides a means for communicating with various other apparatuses over a transmission medium. The transceiver 1230 receives a signal from the one or more antennas 1235, extracts information from the received signal, and provides the extracted information to the processing system 1210, specifically the reception component 1102. In addition, the transceiver 1230 receives information from the processing system 1210, specifically the transmission component 1104, and generates a signal to be applied to the one or more antennas 1235 based at least in part on the received information.

The processing system 1210 includes a processor 1220 coupled to a computer-readable medium/memory 1225. The processor 1220 is responsible for general processing, including the execution of software stored on the computer-readable medium/memory 1225. The software, when executed by the processor 1220, causes the processing system 1210 to perform the various functions described herein for any particular apparatus. The computer-readable medium/memory 1225 may also be used for storing data that is manipulated by the processor 1220 when executing software. The processing system further includes at least one of the illustrated components. The components may be software modules running in the processor 1220, resident/stored in the computer readable medium/memory 1225, one or more hardware modules coupled to the processor 1220, or some combination thereof.

In some aspects, the processing system 1210 may be a component of the network node 110 and may include the memory 242 and/or at least one of the TX MIMO processor 230, the RX processor 238, and/or the controller/processor 240. In some aspects, the apparatus 1205 for wireless communication includes means for transmitting downlink control information conveying at least one TPC command; and means for receiving a communication using a transmit power based at least in part on the at least one TPC command and a power mode. The aforementioned means may be one or more of the aforementioned components of the apparatus 1100 and/or the processing system 1210 of the apparatus 1205 configured to perform the functions recited by the aforementioned means. As described elsewhere herein, the processing system 1210 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 12 is provided as an example. Other examples may differ from what is described in connection with FIG. 12.

The following provides an overview of some Aspects of the present disclosure:

Aspect 1: A method of wireless communication performed by a user equipment (UE), comprising: receiving downlink control information conveying at least one transmit power control (TPC) command; and transmitting a communication using a transmit power based at least in part on the at least one TPC command and a power mode.

Aspect 2: The method of Aspect 1, wherein a physical uplink shared channel for conveying the communication occurs during a period associated with a network power saving mode; and further comprising: determining the transmit power based at least in part on an accumulation of one or more TPC commands, of the at least one TPC command, that are received in connection with the period associated with the network power saving mode.

Aspect 3: The method of any of Aspects 1-2, wherein receiving the at least one TPC command comprises: receiving, during a first network power mode, a particular TPC command after a first transmission occasion associated with the first network power mode; and determining, based at least in part on an absolute value of the particular TPC command and when a TPC accumulation mode is active, the transmit power for transmitting the communication in a second transmission occasion associated with a second network power mode.

Aspect 4: The method of any of Aspects 1-3, wherein receiving the at least one TPC command comprises: receiving, during a particular network mode, a particular TPC command; and determining the transmit power for a physical uplink shared channel transmission occasion for transmitting the communication during the particular network mode using an accumulative TPC value or an absolute TPC value, wherein the transmit power is determined using the accumulative TPC value or the absolute TPC value based at least in part on a type of active TPC mode.

Aspect 5: The method of any of Aspects 1-4, wherein the at least one TPC command is received after a first transmission occasion and before a second transmission occasion, the first transmission occasion and the second transmission occasion being associated with a first network power mode, a second network power mode occurring between the first transmission occasion and the second transmission occasion.

Aspect 6: The method of Aspect 5, further comprising: determining the transmit power based at least in part on one or more TPC commands, of the at least one TPC command, received during the first network power mode and excluding any TPC commands received during the second network power mode.

Aspect 7: The method of Aspect 5, further comprising: determining the transmit power based at least in part on one or more TPC commands, of the at least one TPC command, received after an end of the second network power mode and excluding any TPC commands received before the end of the second network power mode.

Aspect 8: The method of any of Aspects 1-7, wherein a mapping of the at least one TPC command to a set of TPC accumulation values, of a plurality of possible sets of TPC accumulation values, is based at least in part on the power mode.

Aspect 9: The method of any of Aspects 1-8, wherein a mapping of the at least one TPC command to a set of TPC absolute values, of a plurality of possible sets of TPC absolute values, is based at least in part on the power mode.

Aspect 10: A method of wireless communication performed by a network node, comprising: transmitting downlink control information conveying at least one transmit power control (TPC) command; and receiving a communication using a transmit power based at least in part on the at least one TPC command and a power mode.

Aspect 11: The method of Aspect 10, wherein a physical uplink shared channel for conveying the communication occurs during a period associated with a network power saving mode; and wherein the transmit power is based at least in part on an accumulation of one or more TPC commands, of the at least one TPC command, that are transmitted in connection with the period associated with the network power saving mode.

Aspect 12: The method of any of Aspects 10-11, wherein transmitting the at least one TPC command comprises: transmitting, during a first network power mode, a particular TPC command after a first transmission occasion associated with the first network power mode, wherein the transmit power, for transmitting the communication in a second transmission occasion associated with a second network power mode, is determined based at least in part on an absolute value of the particular TPC command and when a TPC accumulation mode is active.

Aspect 13: The method of any of Aspects 10-12, wherein transmitting the at least one TPC command comprises: transmitting, during a particular network mode, a particular TPC command, wherein the transmit power, for a physical uplink shared channel transmission occasion for transmitting the communication during the particular network mode, is determined using an accumulative TPC value or using an absolute TPC value and is based at least in part on a type of active TPC mode.

Aspect 14: The method of any of Aspects 10-13, wherein the at least one TPC command is transmitted after a first transmission occasion and before a second transmission occasion, the first transmission occasion and the second transmission occasion being associated with a first network power mode, a second network power mode occurring between the first transmission occasion and the second transmission occasion.

Aspect 15: The method of Aspect 14, where the transmit power is based at least in part on one or more TPC commands, of the at least one TPC command, transmitted during the first network power mode and excluding any TPC commands transmitted during the second network power mode.

Aspect 16: The method of Aspect 14, wherein the transmit power is based at least in part on one or more TPC commands, of the at least one TPC command, transmitted after an end of the second network power mode and excluding any TPC commands transmitted before the end of the second network power mode.

Aspect 17: The method of any of Aspects 10-16, wherein a mapping of the at least one TPC command to a set of TPC accumulation values, of a plurality of possible sets of TPC accumulation values, is based at least in part on the power mode.

Aspect 18: The method of any of Aspects 10-17, wherein a mapping of the at least one TPC command to a set of TPC absolute values, of a plurality of possible sets of TPC absolute values, is based at least in part on the power mode.

Aspect 19: An apparatus for wireless communication at a device, comprising a processor; memory coupled with the processor; and instructions stored in the memory and executable by the processor to cause the apparatus to perform the method of one or more of Aspects 1-9.

Aspect 20: A device for wireless communication, comprising a memory and one or more processors coupled to the memory, the one or more processors configured to perform the method of one or more of Aspects 1-9.

Aspect 21: An apparatus for wireless communication, comprising at least one means for performing the method of one or more of Aspects 1-9.

Aspect 22: A non-transitory computer-readable medium storing code for wireless communication, the code comprising instructions executable by a processor to perform the method of one or more of Aspects 1-9.

Aspect 23: A non-transitory computer-readable medium storing a set of instructions for wireless communication, the set of instructions comprising one or more instructions that, when executed by one or more processors of a device, cause the device to perform the method of one or more of Aspects 1-9.

Aspect 24: An apparatus for wireless communication at a device, comprising a processor; memory coupled with the processor; and instructions stored in the memory and executable by the processor to cause the apparatus to perform the method of one or more of Aspects 10-18.

Aspect 25: A device for wireless communication, comprising a memory and one or more processors coupled to the memory, the one or more processors configured to perform the method of one or more of Aspects 10-18.

Aspect 26: An apparatus for wireless communication, comprising at least one means for performing the method of one or more of Aspects 10-18.

Aspect 27: A non-transitory computer-readable medium storing code for wireless communication, the code comprising instructions executable by a processor to perform the method of one or more of Aspects 10-18.

Aspect 28: A non-transitory computer-readable medium storing a set of instructions for wireless communication, the set of instructions comprising one or more instructions that, when executed by one or more processors of a device, cause the device to perform the method of one or more of Aspects 10-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive downlink control information conveying a plurality of transmit power control (TPC) commands;
      determine a transmit power based at least in part on whether at least one TPC command, of the plurality of TPC commands, is received during a first power mode,
         wherein the transmit power is based on:
            an absolute value of a TPC command, of the plurality of TPC commands, when the TPC command is received during the first power mode, or
            a summation of values corresponding to the plurality of TPC commands when all of the plurality of TPC commands are received during a second power mode; and
      transmit a communication using the transmit power.

2. The UE of claim 1, wherein a physical uplink shared channel for conveying the communication occurs during a period associated with the second power mode, wherein the second power mode is a network power saving mode.

3. The UE of claim 1, wherein the one or more processors, to receive the plurality of TPC commands, are configured to:
   receive, during the first power mode, the TPC command after a first transmission occasion associated with the first power mode; and
   wherein the one or more processors, to transmit the communication using the transmit power, are configured to:
      transmit the communication using the transmit power in a second transmission occasion associated with the second power mode.

4. The UE of claim 1, wherein the one or more processors, to receive the plurality of TPC commands, are configured to:
   receive, during the first power mode, the TPC command; and
   wherein the one or more processors, to determine the transmit power, are configured to:
      determine the transmit power for a physical uplink shared channel transmission occasion for transmitting the communication during the second power mode using the absolute value of the TPC command based at least in part on the TPC command being received during the first power mode.

5. The UE of claim 1, wherein a mapping of the plurality of TPC commands to a set of TPC accumulation values, of a plurality of possible sets of TPC accumulation values, is based at least in part on the second power mode.

6. The UE of claim 1, wherein a mapping of the plurality of TPC commands to a set of TPC absolute values, of a plurality of possible sets of TPC absolute values, is based at least in part on the first power mode.

7. A network node for wireless communication, comprising:
   one or more memories; and
   one or more processors, coupled to the one or more memories, configured to:

transmit downlink control information conveying a
plurality of transmit power control (TPC) commands; and
receive a communication using a transmit power,
wherein the transmit power is based at least in part on whether at least one TPC command, of the plurality of TPC commands, is transmitted during a first power mode, and
wherein the transmit power is based on:
an absolute value of a TPC command, of the plurality of TPC commands, when the TPC command is transmitted during the first power mode, or
a summation of values corresponding to the plurality of TPC commands when all of the plurality of TPC commands are transmitted during a second power mode.

8. The network node of claim 7, wherein a physical uplink shared channel for conveying the communication occurs during a period associated with the second power mode, wherein the second power mode is a network power saving mode.

9. The network node of claim 7, wherein the one or more processors, to transmit the plurality of TPC commands, are configured to:
transmit, during the first power mode, the TPC command after a first transmission occasion associated with the first power mode, and
wherein the one or more processors, to receive the communication using the transmit power, are configured to:
receive the communication in a second transmission occasion associated with the second power mode.

10. The network node of claim 7, wherein the one or more processors, to transmit the plurality of TPC commands, are configured to:
transmit, during the first power mode, the TPC command, wherein the transmit power, for a physical uplink shared channel transmission occasion for receiving the communication during the second power mode, is determined using the absolute value of the TPC command based at least in part on the TPC command being transmitted during the first power mode.

11. The network node of claim 7, wherein a mapping of the plurality of TPC commands to a set of TPC accumulation values, of a plurality of possible sets of TPC accumulation values, is based at least in part on the second power mode.

12. The network node of claim 7, wherein a mapping of the plurality of TPC commands to a set of TPC absolute values, of a plurality of possible sets of TPC absolute values, is based at least in part on the first power mode.

13. A method of wireless communication performed by a user equipment (UE), comprising:
receiving downlink control information conveying a plurality of transmit power control (TPC) commands;
determining a transmit power based at least in part on whether at least one TPC command, of the plurality of TPC commands, is received during a first power mode,
wherein the transmit power is based on:
an absolute value of a TPC command, of the plurality of TPC commands, when the TPC command is received during the first power mode, or
a summation of values corresponding to the plurality of TPC commands when all of the plurality of TPC commands are received during a second power mode; and
transmitting a communication using the transmit power.

14. The method of claim 13, wherein a physical uplink shared channel for conveying the communication occurs during a period associated with the second power mode, wherein the second power mode is a network power saving mode.

15. The method of claim 13, wherein receiving the plurality of TPC commands comprises:
receiving, during the first power mode, the TPC command after a first transmission occasion associated with the first power mode; and
wherein the communication is transmitted in a second transmission occasion associated with the second power mode.

16. The method of claim 13, wherein receiving the plurality of TPC commands comprises:
receiving, during the first power mode, the TPC command; and
wherein determining the transmit power comprises:
determining the transmit power for a physical uplink shared channel transmission occasion for transmitting the communication during the second power mode using the absolute value of the TPC command based at least in part on the TPC command being received during the first power mode.

17. The method of claim 13, wherein a mapping of the plurality of TPC commands to a set of TPC accumulation values, of a plurality of possible sets of TPC accumulation values, is based at least in part on the second power mode.

18. The method of claim 13, wherein a mapping of the plurality of TPC commands to a set of TPC absolute values, of a plurality of possible sets of TPC absolute values, is based at least in part on the first power mode.

19. A method of wireless communication performed by a network node, comprising:
transmitting downlink control information conveying a plurality of transmit power control (TPC) commands; and
receiving a communication using a transmit power,
wherein the transmit power is based at least in part on whether at least one TPC command, of the plurality of TPC commands, is transmitted during a first power mode, and
wherein the transmit power is based on:
an absolute value of a TPC command, of the plurality of TPC commands, when the TPC command is transmitted during the first power mode, or
a summation of values corresponding to the plurality of TPC commands when all of the plurality of TPC commands are transmitted during a second power mode.

20. The method of claim 19, wherein a physical uplink shared channel for conveying the communication occurs during a period associated with the second power mode, wherein the second power mode is a network power saving mode.

21. The method of claim 19, wherein transmitting the plurality of TPC commands comprises:
transmitting, during the first power mode, the TPC command after a first transmission occasion associated with the first power mode, and
wherein the communication is received in a second transmission occasion associated with a second power mode.

22. The method of claim 19, wherein a mapping of the plurality of TPC commands to a set of TPC accumulation values, of a plurality of possible sets of TPC accumulation values, is based at least in part on the second power mode.

23. The method of claim 19, wherein a mapping of the plurality of TPC commands to a set of TPC absolute values, of a plurality of possible sets of TPC absolute values, is based at least in part on the first power mode.

24. The method of claim 19, wherein transmitting the plurality of TPC commands comprises:
   transmitting, during the first power mode, the TPC command,
      wherein the transmit power, for a physical uplink shared channel transmission occasion for receiving the communication during the second power mode, is determined using the absolute value of the TPC command based at least in part on the TPC command being transmitted during the first power mode.

25. The UE of claim 1, wherein the transmit power is based on the absolute value of the TPC command when the TPC command is received during the first power mode and during an accumulation window for a physical uplink shared channel occasion occurring during the second power mode.

26. The UE of claim 1, wherein the communication is a physical uplink control channel, physical random access channel (PRACH), or sounding reference signal (SRS) communication.

27. The network node of claim 7, wherein the transmit power is based on the absolute value of the TPC command when the TPC command is transmitted during the first power mode and during an accumulation window for a physical uplink shared channel occasion occurring during the second power mode.

28. The network node of claim 7, wherein the communication is a physical uplink control channel, physical random access channel (PRACH), or sounding reference signal (SRS) communication.

29. The method of claim 13, wherein the transmit power is based on the absolute value of the TPC command when the TPC command is received during the first power mode and during an accumulation window for a physical uplink shared channel occasion occurring during the second power mode.

30. The method of claim 19, wherein the transmit power is based on the absolute value of the TPC command when the TPC command is transmitted during the first power mode and during an accumulation window for a physical uplink shared channel occasion occurring during the second power mode.

\* \* \* \* \*